(12) United States Patent
Olson

(10) Patent No.: US 12,049,304 B2
(45) Date of Patent: Jul. 30, 2024

(54) TAIL ROTOR ISOLATION SYSTEMS FOR ROTORCRAFT

(71) Applicant: Textron Innovations Inc., Providence, RI (US)

(72) Inventor: Eric Stephen Olson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 259 days.

(21) Appl. No.: 17/861,702

(22) Filed: Jul. 11, 2022

(65) Prior Publication Data

US 2023/0192277 A1 Jun. 22, 2023

Related U.S. Application Data

(63) Continuation-in-part of application No. 17/516,093, filed on Nov. 1, 2021, now Pat. No. 11,708,155, which is a continuation of application No. 17/063,712, filed on Oct. 5, 2020, now Pat. No. 11,174,015, which is a continuation-in-part of application No. 16/567,086, filed on Sep. 11, 2019, now Pat. No. 10,793,284, which is a continuation-in-part of application No. 16/274,520, filed on Feb. 13, 2019, now Pat. No. 10,788,088.

(Continued)

(51) Int. Cl.
*B64C 27/12* (2006.01)
*B64D 35/08* (2006.01)
*F16D 41/04* (2006.01)

*B64D 27/02* (2006.01)
*F16D 41/06* (2006.01)

(52) U.S. Cl.
CPC .............. *B64C 27/12* (2013.01); *B64D 35/08* (2013.01); *F16D 41/04* (2013.01); *B64D 27/026* (2024.01); *F16D 2041/0603* (2013.01)

(58) Field of Classification Search
CPC ......... B64C 27/12; B64C 27/82; B64D 35/08; B64D 27/06; F16D 41/04; F16D 41/069; F16D 2041/0603; F16D 47/04
See application file for complete search history.

(56) References Cited

U.S. PATENT DOCUMENTS 3,362,255 A 1/1968 De et al.
3,455,182 A 7/1969 Kelley
(Continued)

*Primary Examiner* — Lori Wu
(74) *Attorney, Agent, or Firm* — Lawrence Youst PLLC

(57) ABSTRACT

A tail rotor isolation system for rotorcraft includes a secondary engine, first and second freewheeling units, an isolation assembly and a tail rotor system. The secondary engine is coupled to the input race of the first freewheeling unit. A main rotor system is coupled to the output race of the second freewheeling unit. The isolation assembly is coupled to the output race of the first freewheeling unit and has a fully engaged position coupling the input and output races of the second freewheeling unit and a partially engaged position coupled to the input race but decoupled from the output race of the second freewheeling unit. The tail rotor system is coupled to the input race of the second freewheeling unit such that in the partially engaged position of the isolation assembly, the overrunning mode of the second freewheeling unit isolates the tail rotor system from the main rotor system.

20 Claims, 15 Drawing Sheets

Related U.S. Application Data

(60) Provisional application No. 62/801,621, filed on Feb. 5, 2019.

(56) References Cited

U.S. PATENT DOCUMENTS

| | | | |
|---|---|---|---|
| 4,605,107 A | 8/1986 | Hallidy et al. | |
| 4,711,332 A | 12/1987 | Schuster | |
| 5,271,295 A | 12/1993 | Marnot | |
| 6,098,921 A | 8/2000 | Piasecki | |
| 6,313,625 B1 | 11/2001 | Varady et al. | |
| 8,950,700 B2 | 2/2015 | Westhuizen | |
| 9,580,184 B2 | 2/2017 | Bornes | |
| 10,040,566 B2 | 8/2018 | Waltner | |
| 10,788,088 B2 | 9/2020 | Olson et al. | |
| 10,793,284 B2 | 10/2020 | Prater et al. | |
| 11,174,013 B2 | 11/2021 | Olson et al. | |
| 11,174,014 B2 | 11/2021 | Olson | |
| 11,174,015 B2 | 11/2021 | Goodwin et al. | |
| 2006/0269414 A1 | 11/2006 | Palcic et al. | |
| 2009/0078525 A1 | 3/2009 | Schumacher et al. | |
| 2010/0279815 A1* | 11/2010 | Stille | B64C 27/14 475/286 |
| 2011/0048147 A1 | 3/2011 | Keech et al. | |
| 2014/0191079 A1* | 7/2014 | Ehinger | B64D 35/04 244/17.13 |
| 2016/0288779 A1 | 10/2016 | Kotloski et al. | |
| 2017/0327241 A1 | 11/2017 | Mitrovic et al. | |
| 2018/0009524 A1* | 1/2018 | Wolcott | F16D 11/14 |
| 2018/0086444 A1 | 3/2018 | Poster et al. | |
| 2018/0172088 A1 | 6/2018 | Peglowski et al. | |
| 2018/0201386 A1* | 7/2018 | Strauss | B64C 27/12 |
| 2018/0202546 A1 | 7/2018 | Egashira et al. | |
| 2018/0215463 A1* | 8/2018 | Garcia | B64C 27/12 |
| 2018/0313414 A1 | 11/2018 | Finkenzeller | |
| 2019/0032760 A1 | 1/2019 | Geiser et al. | |
| 2019/0368592 A1 | 12/2019 | Gostin, Jr. et al. | |
| 2020/0070996 A1* | 3/2020 | Hefner | B64C 27/82 |
| 2020/0223540 A1* | 7/2020 | Ivans | B64C 27/82 |
| 2020/0247553 A1 | 8/2020 | Prater et al. | |
| 2020/0248760 A1 | 8/2020 | Olson et al. | |
| 2020/0324884 A1* | 10/2020 | Wilcox | B64D 35/02 |
| 2021/0061452 A1 | 3/2021 | Olson et al. | |
| 2021/0061453 A1 | 3/2021 | Olson | |
| 2021/0070430 A1 | 3/2021 | Goodwin et al. | |
| 2022/0388673 A1* | 12/2022 | Thiriet | B64D 27/24 |
| 2022/0411050 A1* | 12/2022 | Lavallee | B64C 27/56 |

\* cited by examiner

TAIL ROTOR ISOLATION SYSTEMS FOR ROTORCRAFT

CROSS-REFERENCE TO RELATED APPLICATIONS

The present application is a continuation-in-part of co-pending application Ser. No. 17/516,093, filed Nov. 1, 2021, which is a continuation of application Ser. No. 17/063,712, filed Oct. 5, 2020, which is a continuation-in-part of application Ser. No. 16/567,086, filed Sep. 11, 2019, which is a continuation-in-part of application Ser. No. 16/274,520, filed Feb. 13, 2019, which claims the benefit of provisional application No. 62/801,621, filed Feb. 5, 2019, the entire contents of each are hereby incorporated by reference.

GOVERNMENT RIGHTS

This invention was made with Government support under Agreement No. W911W6-19-9-0002, awarded by the Army Contracting Command-Redstone Arsenal. The Government has certain rights in the invention.

TECHNICAL FIELD OF THE DISCLOSURE

The present disclosure relates, in general, to improving rotorcraft safety during ground operations and, in particular, to a tail rotor isolation system configured to selectively couple and decouple the tail rotor from torque generated by the main rotor system, selectively transmit torque to the tail rotor from a secondary engine and stop rotation of the tail rotor during ground operations.

BACKGROUND

Many rotorcraft are capable of taking off, hovering and landing vertically. One such rotorcraft is a helicopter, which has a main rotor that provides lift and thrust to the aircraft. The main rotor not only enables hovering and vertical takeoff and landing, but also enables forward, backward and lateral flight. These attributes make helicopters highly versatile for use in congested, isolated or remote areas. It has been found that the power demand of a rotorcraft can vary significantly based upon the operation being performed. For example, low power demand exists during preflight operations, when power is only needed to operate accessories such as generators, air pumps, oil pumps, hydraulic systems and the like as well as to start the main engine. Certain rotorcraft utilize a dedicated auxiliary power unit to generate preflight accessory power. During takeoff, hover, heavy lifts and/or high-speed operations, rotorcraft experience high power demand. Certain rotorcraft utilize multiple main engines or one main engine and a supplemental power unit to generate the required power for the main rotor during such high-power demand flight operations. In conventional rotorcraft, the dedicated auxiliary power unit is not operable to provide supplemental power to the main rotor during high power demand flight operations. During ground operations, the tail rotor of a running rotorcraft can be dangerous to crew, passengers or other ground personnel as an encounter with a rotating tail rotor can be fatal. Exacerbating matters, a rotating tail rotor can be difficult to see. Accordingly, a need has arisen for improved rotorcraft systems that enable power for preflight operations, supplemental power during high-power demand operations and/or non-rotation of the tail rotor during ground operations.

SUMMARY

In a first aspect, the present disclosure is directed to a tail rotor isolation system for rotorcraft having a main rotor system including a main engine, a main rotor gearbox and a main rotor. The tail rotor isolation system includes a secondary engine, first and second freewheeling units, an isolation assembly and a tail rotor system. The first and second freewheeling units each have an input race and an output race such that torque applied to the input race is transferred to the output race in a driving mode and torque applied to the output race is not transferred to the input race in an overrunning mode. The input race of the first freewheeling unit is coupled to the secondary engine. The output race of the second freewheeling unit is coupled to the main rotor system. The isolation assembly is disposed between the first and second freewheeling units. The isolation assembly is coupled to the output race of the first freewheeling unit. The isolation assembly has a fully engaged position in which the isolation assembly couples the input and output races of the second freewheeling unit and a partially engaged position in which the isolation assembly is coupled to the input race of the second freewheeling unit and decoupled from the output race of the second freewheeling unit. The tail rotor system is coupled to the input race of the second freewheeling unit. In the partially engaged position of the isolation assembly, the overrunning mode of the second freewheeling unit isolates the tail rotor system from torque generated by the main rotor system. Also, in the partially engaged position of the isolation assembly, the tail rotor system is coupled to torque generated by the secondary engine. In the fully engaged position of the isolation assembly, the tail rotor system is coupled to torque generated by the main rotor system and the secondary engine.

In some embodiments, the secondary engine may be configured to generate between 5 percent and 20 percent of the power of the main engine. In other embodiments, the secondary engine may be configured to generate approximately the same amount of power as the main engine. In certain embodiments, the secondary engine may be a gas turbine engine. In other embodiments, the secondary engine may be an electric motor. In some embodiments, the isolation assembly may include an outer housing and a splined adaptor that is disposed within the outer housing, rotatable with the outer housing and translatable relative to the outer housing between the fully engaged position and the partially engaged position with the second freewheeling unit. In such embodiments, the splined adaptor may have a splined coupling with the input race of the second freewheeling unit in both the fully engaged position and the partially engaged position. Also, in such embodiments, the splined adaptor may have a splined coupling with the output race of the second freewheeling unit in the fully engaged position and may be decoupled from the output race of the second freewheeling unit in the partially engaged position. In certain embodiments, the splined adaptor may have outer splines and inner splines such that the outer splines of the splined adaptor may have a splined coupling with inner splines of the input race of the second freewheeling unit in both the fully engaged position and the partially engaged position and such that the inner splines of the splined adaptor may have a splined coupling with outer splines of the output race of the second freewheeling unit in the fully engaged position and may be decoupled from the outer splines of the output race of the second freewheeling unit in the partially engaged position.

In some embodiments, an actuator may be coupled to the splined adaptor and configured to shift the splined adaptor between the fully engaged position and the partially engaged position with the second freewheeling unit. In such embodiments, the actuator may be a linear actuator such as a hydraulic actuator, an electromechanical actuator or a pneumatic actuator. In certain embodiments, the tail rotor system may include a tail rotor and a tail rotor brake. In such embodiments, in the partially engaged position of the isolation assembly and with the main rotor system operating, the tail rotor brake may be configured to stop rotation of the tail rotor when the secondary engine is shut down to establish a ground safety configuration of the rotorcraft. In some embodiments, in the partially engaged position of the isolation assembly, the overrunning mode of the second freewheeling unit may be enabled such that the second freewheeling unit is configured for unidirectional torque transfer from the input race to the output race. In certain embodiments, in the fully engaged position of the isolation assembly, the overrunning mode of the second freewheeling unit may be disabled such that the second freewheeling unit is configured for bidirectional torque transfer between the input race and the output race.

In a second aspect, the present disclosure is directed to a rotorcraft. The rotorcraft includes a main rotor system including a main engine, a main rotor gearbox coupled to the main engine and a main rotor coupled to the main rotor gearbox. The rotorcraft also includes a secondary engine, first and second freewheeling units, an isolation assembly and a tail rotor system. The first and second freewheeling units each have an input race and an output race such that torque applied to the input race is transferred to the output race in a driving mode and torque applied to the output race is not transferred to the input race in an overrunning mode. The input race of the first freewheeling unit is coupled to the secondary engine. The output race of the second freewheeling unit is coupled to the main rotor system. The isolation assembly is disposed between the first and second freewheeling units. The isolation assembly is coupled to the output race of the first freewheeling unit. The isolation assembly has a fully engaged position in which the isolation assembly couples the input and output races of the second freewheeling unit and a partially engaged position in which the isolation assembly is coupled to the input race of the second freewheeling unit and decoupled from the output race of the second freewheeling unit. The tail rotor system is coupled to the input race of the second freewheeling unit. In the partially engaged position of the isolation assembly, the overrunning mode of the second freewheeling unit isolates the tail rotor system from torque generated by the main rotor system. Also, in the partially engaged position of the isolation assembly, the tail rotor system is coupled to torque generated by the secondary engine. In the fully engaged position of the isolation assembly, the tail rotor system is coupled to torque generated by the main rotor system and the secondary engine.

In certain embodiments, the rotorcraft may be a helicopter. In some embodiments, in a ground safety configuration, the isolation assembly is in the partially engaged position, the main rotor system is operating, the secondary engine is shut down and the tail rotor brake is engaged to stop rotation of the tail rotor. In certain embodiments, in an enhanced power configuration, the isolation assembly is in the fully engaged position, the main engine provides power to the main rotor gearbox and the secondary engine provides power to the tail rotor system and the main rotor system through the first and second freewheeling units and the isolation assembly. In some embodiments, in a high efficiency configuration, the isolation assembly is in the fully engaged position, the secondary engine is in standby mode and the main engine provides power to the main rotor gearbox and the tail rotor system through the second freewheeling unit. In certain embodiments, in an enhanced autorotation configuration, the isolation assembly is in the fully engaged position, the main engine is not operating and the secondary engine provides power to the main rotor system through the first and second freewheeling units and the isolation assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
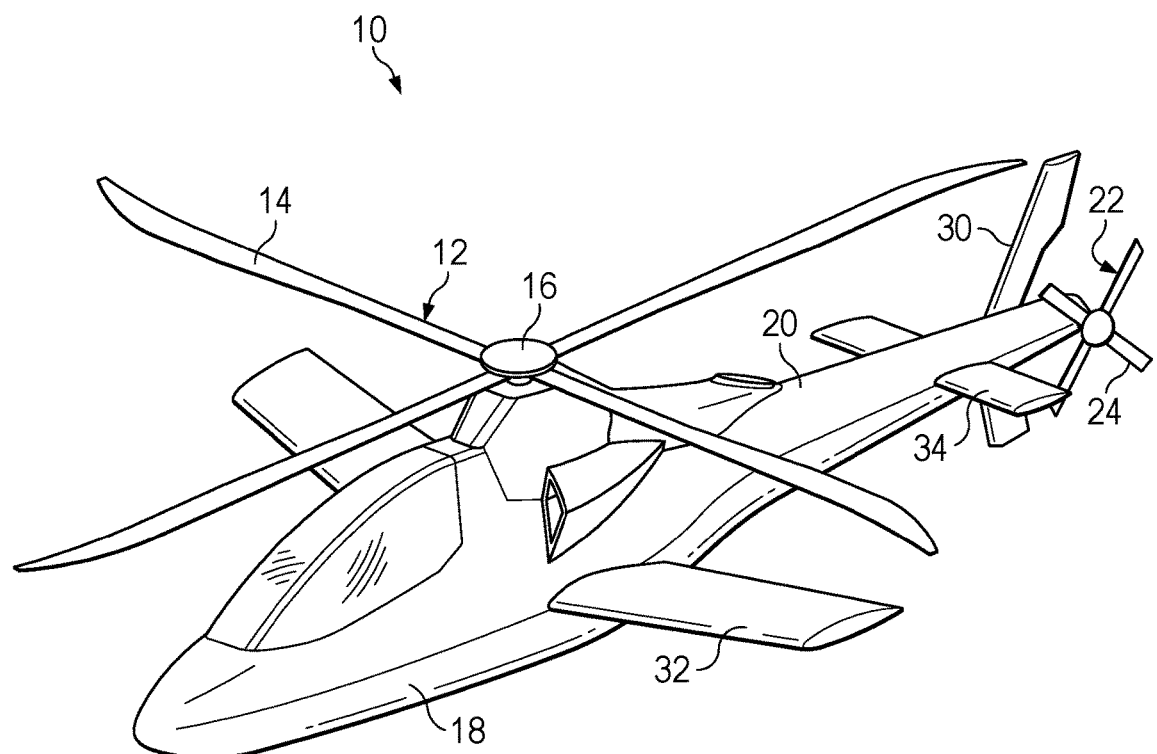
FIGS. 1A-1C are schematic illustrations of a rotorcraft having a tail rotor isolation system in accordance with embodiments of the present disclosure.
Figure 1B:
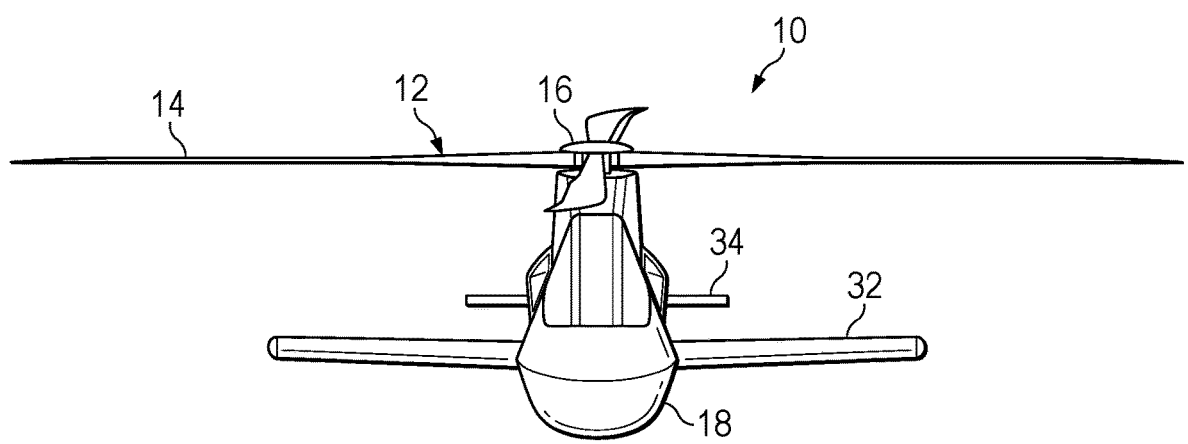
Figure 1C:
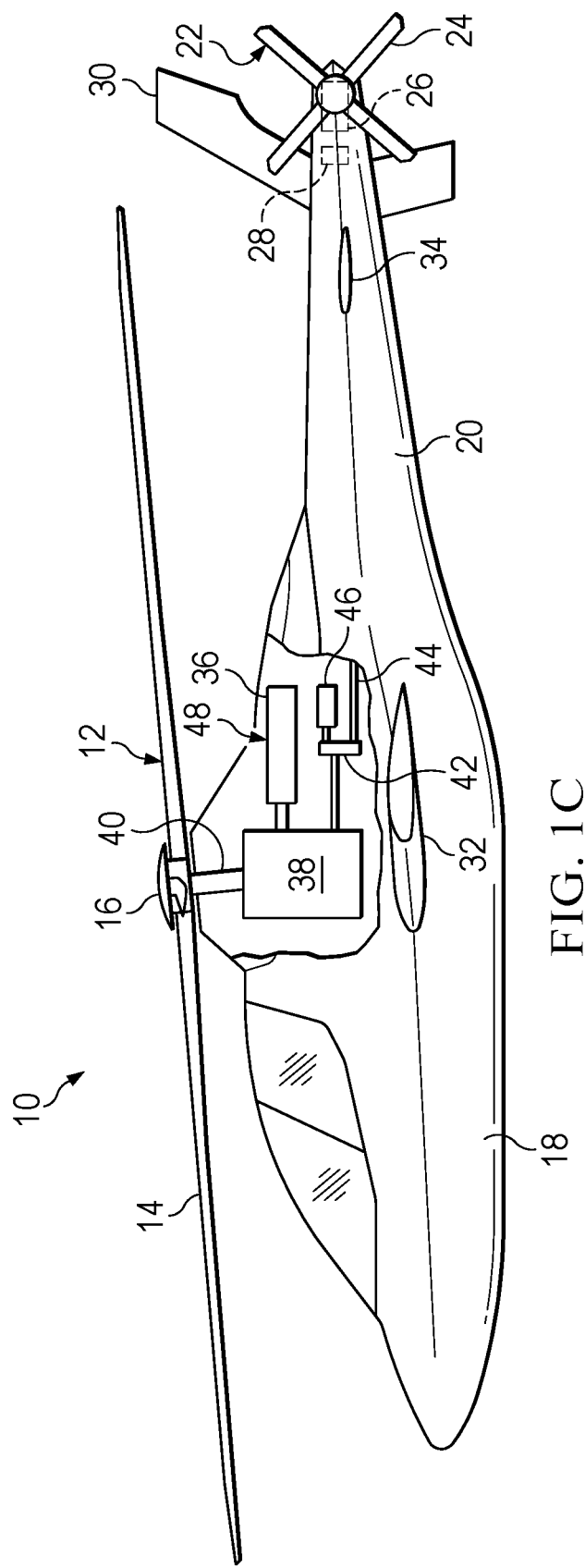

Referring to FIGS. 1A-1C in the drawings, a rotorcraft in the form of a helicopter is schematically illustrated and generally designated 10. The primary propulsion assembly of helicopter 10 is a main rotor 12. Main rotor 12 includes a plurality of rotor blades 14 extending radially outward from a main rotor hub 16. Main rotor 12 is coupled to a fuselage 18 and is rotatable relative thereto. The pitch of rotor blades 14 can be collectively and/or cyclically manipulated to selectively control direction, thrust and lift of helicopter 10. A tailboom 20 is coupled to fuselage 18 and extends from fuselage 18 in the aft direction. Anti-torque is provided to helicopter 10 by a tail rotor system 22 that includes a tail rotor 24, a tail rotor gearbox 26 and a tail rotor brake 28. Tail rotor system 22 controls the yaw of helicopter 10 by counteracting the torque exerted on fuselage 18 by main rotor 12. In the illustrated embodiment, helicopter 10 includes a vertical tail fin 30 that provide stabilization to helicopter 10 during high-speed forward flight. In addition, helicopter 10 includes wing members 32 that extend laterally from fuselage 18 and wing members 34 that extend laterally from tailboom 20. Wing members 32, 34 provide lift compounding to helicopter 10 responsive to the forward airspeed of helicopter 10, thereby reducing the lift requirement on main rotor 12 and increasing the top speed of helicopter 10

Main rotor 12 receive torque and rotational energy from a main engine 36. Main engine 36 is coupled to a main rotor gearbox 38 by suitable clutching and shafting. Main rotor gearbox 38 is coupled to main rotor 12 by a mast 40. As discussed herein, main rotor gearbox 38 is also selectively coupled to tail rotor system 22 through a secondary gearbox 42 and a tail rotor drive shaft 44. In the illustrated embodiment, a secondary engine 46 is also coupled to secondary gearbox 42. Collectively, main engine 36, main rotor gearbox 38 and main rotor 12 may be referred to herein as the main rotor system 48.

During ground operations, a rotating tail rotor can be dangerous to crew, passengers or other ground personnel as an encounter with a rotating tail rotor can be fatal. Exacerbating matters, a rotating tail rotor can be difficult to see. In the present embodiments, tail rotor system 22 can be selectively isolated from torque generated by main rotor system 48 based upon the configuration of secondary gearbox 42. When tail rotor system 22 is isolated from torque generated by main rotor system 48, rotation of tail rotor 24 is controlled by operation of secondary engine 46 and tail rotor brake 28. In some embodiments, secondary engine 46 is operable as an auxiliary power unit to provide preflight power to the accessories of helicopter 10 such as electric generators, air pumps, oil pumps, hydraulic systems and the like as well as to provide the power required to start main engine 36. In addition, secondary engine 46 is operable to provide supplemental power to main rotor 12 that is additive with the power provided by main engine 36 during, for example, high-power demand conditions including takeoff, hover, heavy lifts and high-speed flight operations. Secondary engine 46 is also operable to provide emergency power to main rotor 12. For example, in the event of a failure of main engine 36, secondary engine 46 is operable to provide emergency power to enhance the autorotation and flare recovery maneuver of helicopter 10. Use of secondary engine 46 not only enhances the safety of helicopter 10 but also increases the efficiency of helicopter 10. For example, having the extra power provided by secondary engine 46 during high-power demand operations allows main engine 32 to be downsized for more efficient single engine operations such as during high efficiency cruise operations.

It should be appreciated that helicopter 10 is merely illustrative of a variety of aircraft that can implement the embodiments disclosed herein. Indeed, the tail rotor isolation system of the present disclosure may be implemented on any rotorcraft. Other aircraft implementations can include hybrid aircraft, unmanned aircraft, gyrocopters, compound helicopters, drones and the like. As such, those skilled in the art will recognize that the tail rotor isolation system of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 2A:
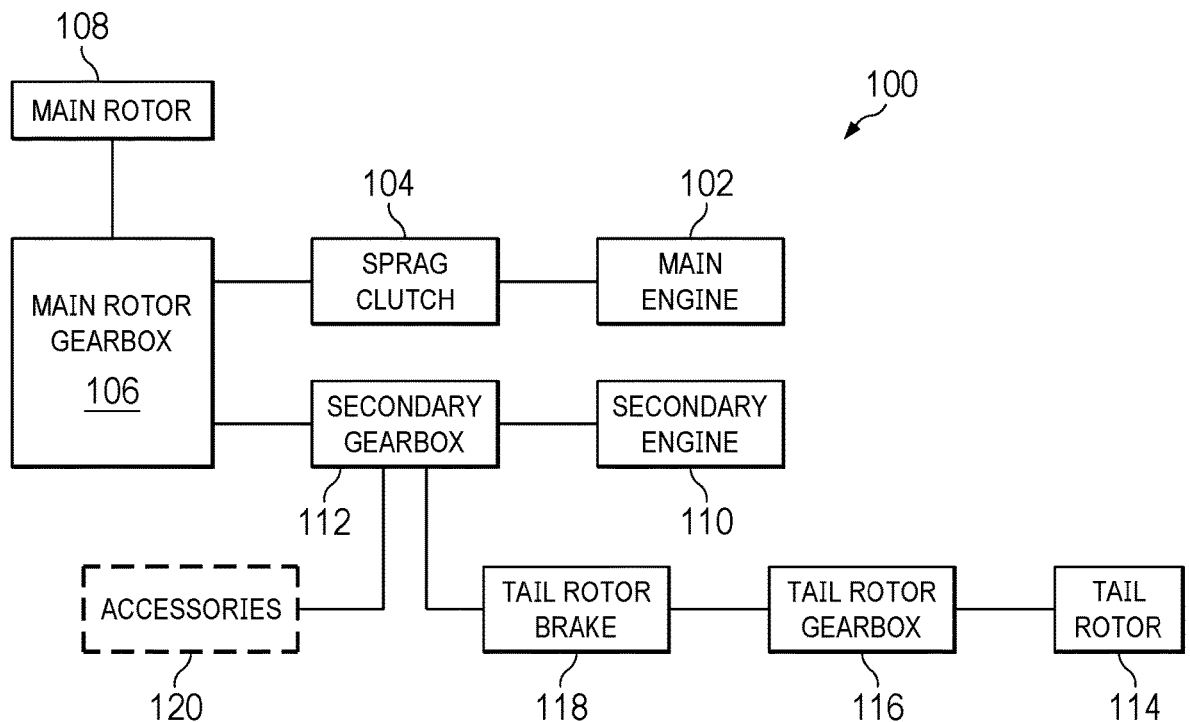
FIGS. 2A-2F are block diagrams of mechanical systems including a tail rotor isolation system for rotorcraft in various operating configurations in accordance with embodiments of the present disclosure.

Referring now to FIG. 2A in the drawings, various mechanical systems of a rotorcraft which is representative of helicopter 10 are illustrated in a block diagram format and are generally designated 100. Systems 100 include a main engine 102 such as a gas turbine engine capable of producing 2000 to 4000 horsepower or more, depending upon the particular implementation. Main engine 102 is coupled to a freewheeling unit depicted as sprag clutch 104 that acts as a one-way clutch enabling a driving mode in which torque from main engine 102 is coupled to main rotor gearbox 106 when the rotating speed of the input race, on the main engine side of sprag clutch 104, is matched with the rotating speed of the output race, on the main rotor gearbox side of sprag clutch 104. Importantly, sprag clutch 104 has an overrunning mode in which main engine 102 is decoupled from main rotor gearbox 106 when the rotating speed of the input race is less than the rotating speed of the output race of sprag clutch 104. Operating sprag clutch 104 in the overrunning mode allows, for example, main rotor 108 to engage in autorotation in the event of a failure of main engine 102.

In the illustrated embodiment, main rotor gearbox 106 is coupled to sprag clutch 104 via a suitable drive shaft. In addition, main rotor gearbox 106 is coupled to main rotor 108 by a suitable mast. Main rotor gearbox 106 includes a gearbox housing and a plurality of gears, such as planetary gears, used to adjust the engine output speed to a suitable rotor speed so that main engine 102 and main rotor 108 may each rotate at optimum speed during flight operations. Collectively, main engine 102, sprag clutch 104, main rotor gearbox 106 and main rotor 108 may be referred to herein as the main rotor system. In the illustrated embodiment, systems 100 also include a secondary engine 110 such as a gas turbine engine or an electric motor capable of producing 200 to 400 horsepower or more, depending upon the particular implementation. For example, secondary engine 110 may generate between 5 percent and 20 percent of the power of main engine 102. In other embodiments, secondary engine 110 may generate approximately the same amount of power as main engine 102, in which case, secondary engine

110 may be referred to as a second main engine suitable for use in a twin engine rotorcraft. In the illustrated embodiment, secondary engine 110 is coupled to a secondary gearbox 112 by a suitable driveshaft. Main rotor gearbox 106 is also coupled to secondary gearbox 112 by a suitable driveshaft. A tail rotor system including tail rotor 114, tail rotor gearbox 116 and tail rotor brake 118 is coupled to secondary gearbox 112 by a suitable tail rotor driveshaft. Optionally, accessories 120 may be coupled to secondary gearbox 112. In other embodiments, the accessories may be powered directly from the main rotor system.

Figure 2B:
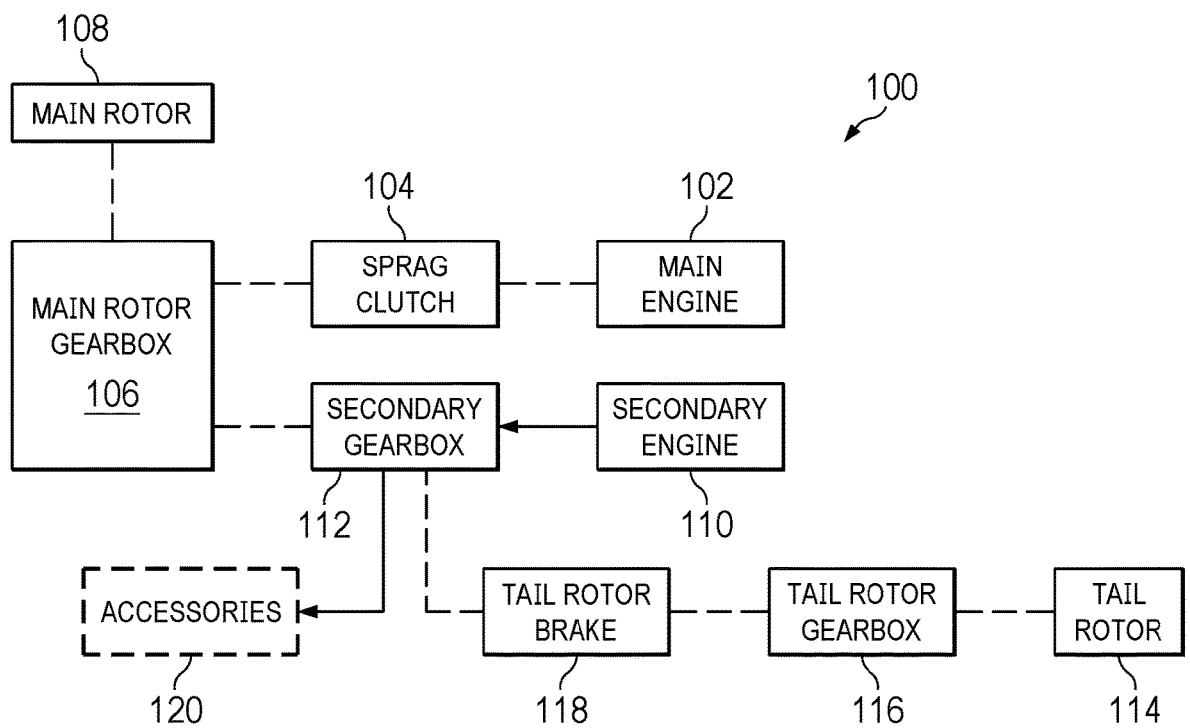

In FIG. 2B, systems 100 are depicted in an auxiliary power configuration that is beneficial for embodiments in which accessories 120 are coupled to secondary gearbox 112. In the illustrated embodiment, secondary engine 110 is providing torque to accessories 120 through secondary gearbox 112 as indicated by the arrows between secondary engine 110, secondary gearbox 112 and accessories 120. As discussed herein, certain embodiments of secondary gearbox 112 have a disengaged position which isolates the tail rotor system from torque from secondary gearbox 112 as well as torque from the main rotor system as indicated by the dashed lines between secondary gearbox 112 and the components of the tail rotor system. Optionally, tail rotor brake 118 may be engaged as a further safety measure against rotation of tail rotor 114. As illustrated, the main rotor system is not operating as indicated by the dashed lines between the components of the main rotor system and the dashed line between main rotor gearbox 106 and secondary gearbox 112.

Figure 2C:
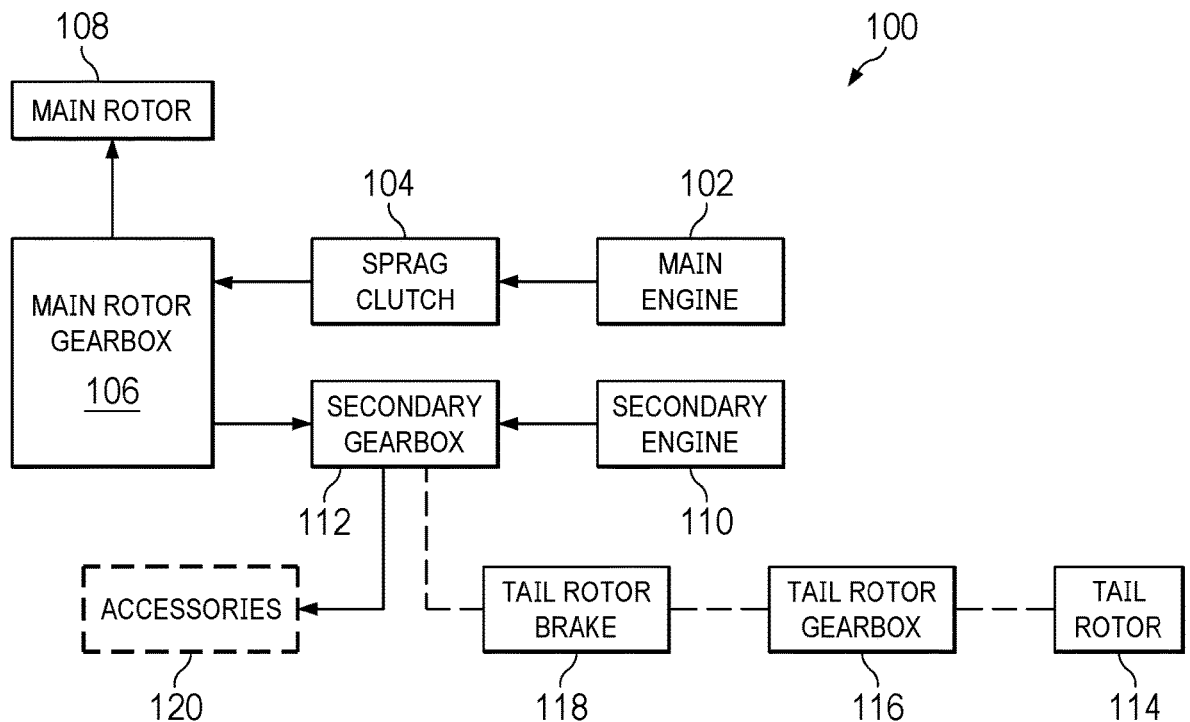

In FIG. 2C, systems 100 are depicted in a main engine ramp up configuration as indicated by the arrows between the components of the main rotor system and the arrow from main rotor gearbox 106 to secondary gearbox 112. In the illustrated embodiment, secondary engine 110 is providing torque to accessories 120 through secondary gearbox 112 as indicated by the arrows between secondary engine 110, secondary gearbox 112 and accessories 120. In this configuration, secondary gearbox 112 is isolating the tail rotor system from torque from secondary gearbox 112 as well as torque from the main rotor system as indicated by the dashed lines between secondary gearbox 112 and the components of the tail rotor system. Optionally, tail rotor brake 118 may be engaged as a further safety measure against rotation of tail rotor 114.

Figure 2D:
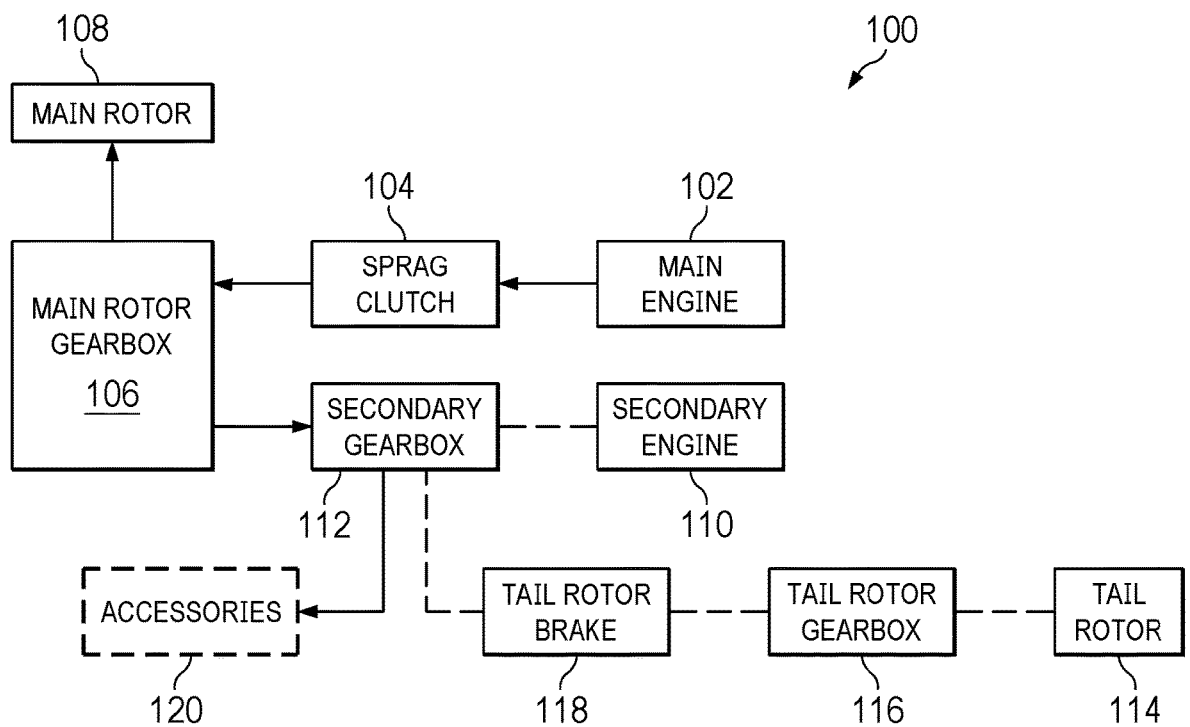

In FIG. 2D, systems 100 are depicted in an auxiliary power off configuration as indicated by the dashed line between secondary engine 110 and secondary gearbox 112. With the main rotor system operating, as indicated by the arrows between the components of the main rotor system and the arrow from main rotor gearbox 106 to secondary gearbox 112, accessories 120 are now powered by the main rotor system as indicated by the arrow from secondary gearbox 112 to accessories 120. In this configuration, secondary gearbox 112 may be shifted from the disengaged position to a partially engaged position which couples secondary engine 110 and the tail rotor system while neither is rotating, as indicated by the dashed lines between secondary engine 110 and secondary gearbox 112 as well as the dashed lines between secondary gearbox 112 and the components of the tail rotor system. In this configuration of secondary gearbox 112, the tail rotor system remains isolated from torque from the main rotor system, also as indicated by the dashed lines between secondary gearbox 112 and the components of the tail rotor system. Optionally, tail rotor brake 118 may be engaged as a further safety measure against rotation of tail rotor 114 and if engaged, should be disengaged prior to the entering the secondary engine ramp up configuration described next.

Figure 2E:
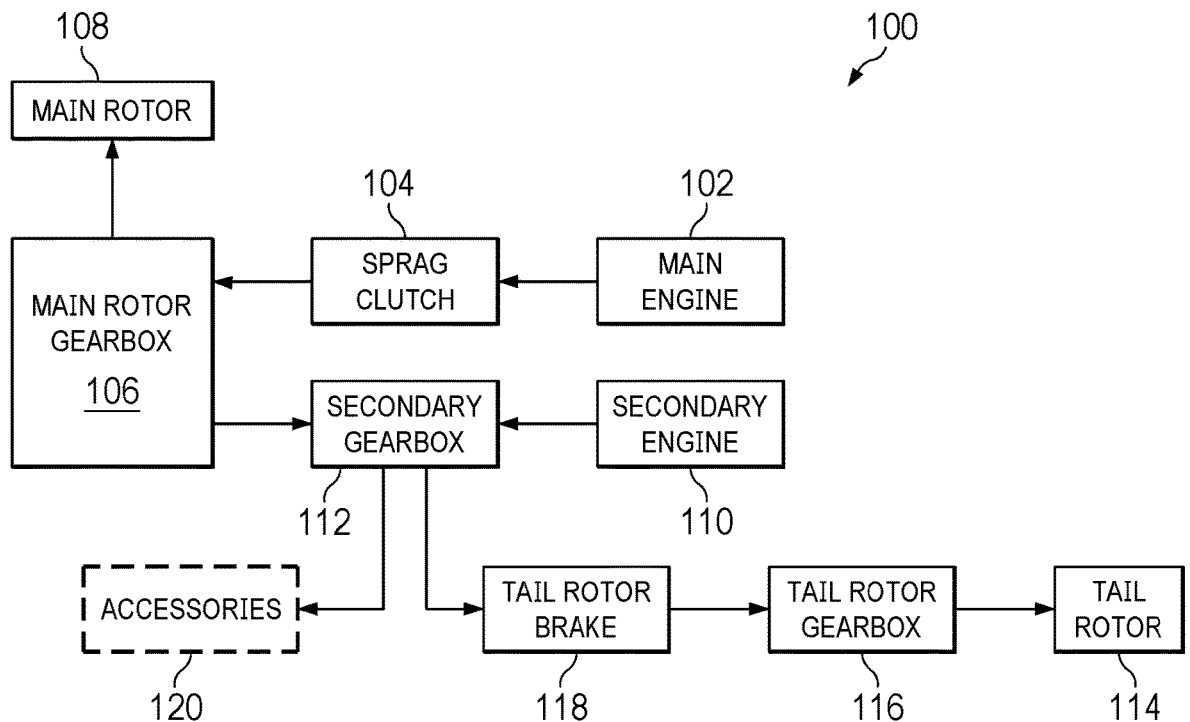

In FIG. 2E, systems 100 are depicted in the secondary engine ramp up configuration as indicated by the arrow from secondary engine 110 to secondary gearbox 112 as well as the arrows between the components of the main rotor system and the arrow from main rotor gearbox 106 to secondary gearbox 112. As secondary gearbox 112 was shifted to the partially engaged position, tail rotor gearbox 116 and tail rotor 114 ramp up with secondary engine 110 as indicated by the arrows between secondary gearbox 112 and the components of the tail rotor system. When secondary engine 110 is fully ramped up to match the rotating speed of the main rotor system, one or both of secondary engine 110 and the main rotor system provide torque to accessories 120 and the tail rotor system via secondary gearbox 112, as indicated by the arrow from secondary gearbox 112 to accessories 120 and by the arrows between secondary gearbox 112 and the components of the tail rotor system. In this configuration, secondary gearbox 112 may be shifted from the partially engaged position to a fully engaged position that couples the main rotor system and the tail rotor system as indicated by the arrow from main rotor gearbox 106 to secondary gearbox 112 and by the arrows between secondary gearbox 112 and the components of the tail rotor system. This configuration of systems 100 may represent a normal flight configuration for a twin engine rotorcraft with both main engine 102 and secondary engine 110 operating together during flight. Alternatively, this configuration of systems 100 may represent an enhanced power configuration for a rotorcraft having a primary engine that provide cruise power and a secondary engine the provides supplemental power.

It should be noted that the fully engaged position of secondary gearbox 112 enables secondary engine 110 to provide torque to the main rotor system through secondary gearbox 112 including in the event of a failure in main engine 102. In this case, an autorotation maneuver may be performed in which the descent of helicopter 10 creates an aerodynamic force on main rotor 108 as air moves up through main rotor 108 generating rotational inertia. Upon final approach during the autorotation landing, helicopter 10 performs a flare recovery maneuver in which the kinetic energy of main rotor 108 is converted into lift using aft cyclic control. Both the autorotation maneuver and the flare recovery maneuver are enhanced by operating secondary engine 110 and sending power through secondary gearbox 112 to the main rotor system. It is noted that rotational energy is also sent to sprag clutch 104, which is operating in its overrunning mode while main engine 102 is not operating. This configuration may be referred to as the enhanced autorotation configuration in which main engine 102 is not operating but secondary engine 110 is providing power to main rotor 108.

Figure 2F:
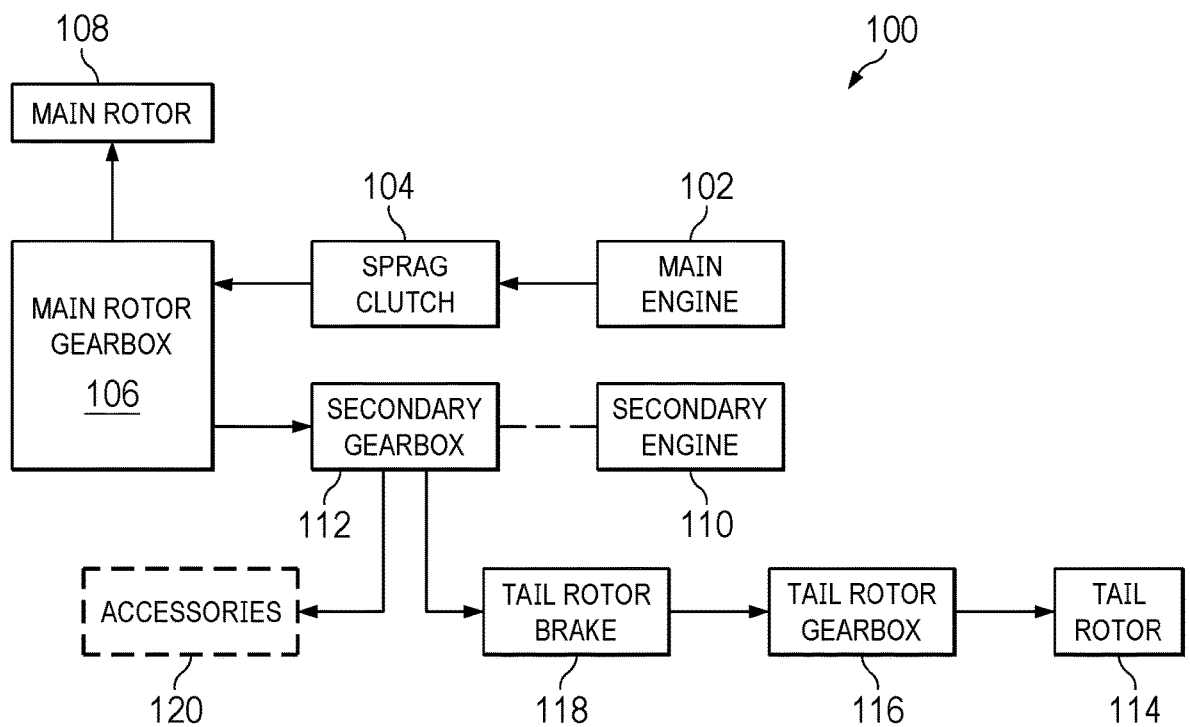

In FIG. 2F, systems 100 are depicted in a high efficiency configuration in which secondary engine 110 has been shut down or placed in standby mode, as indicated by the dashed lines between secondary engine 110 and secondary gearbox 112, while main engine 102 provide power for all components as indicated by the arrows between the components of the main rotor system, the arrow from main rotor gearbox 106 to secondary gearbox 112, the arrow from secondary gearbox 112 to accessories 120 and by the arrows between secondary gearbox 112 and the components of the tail rotor system.

Figure 3A:
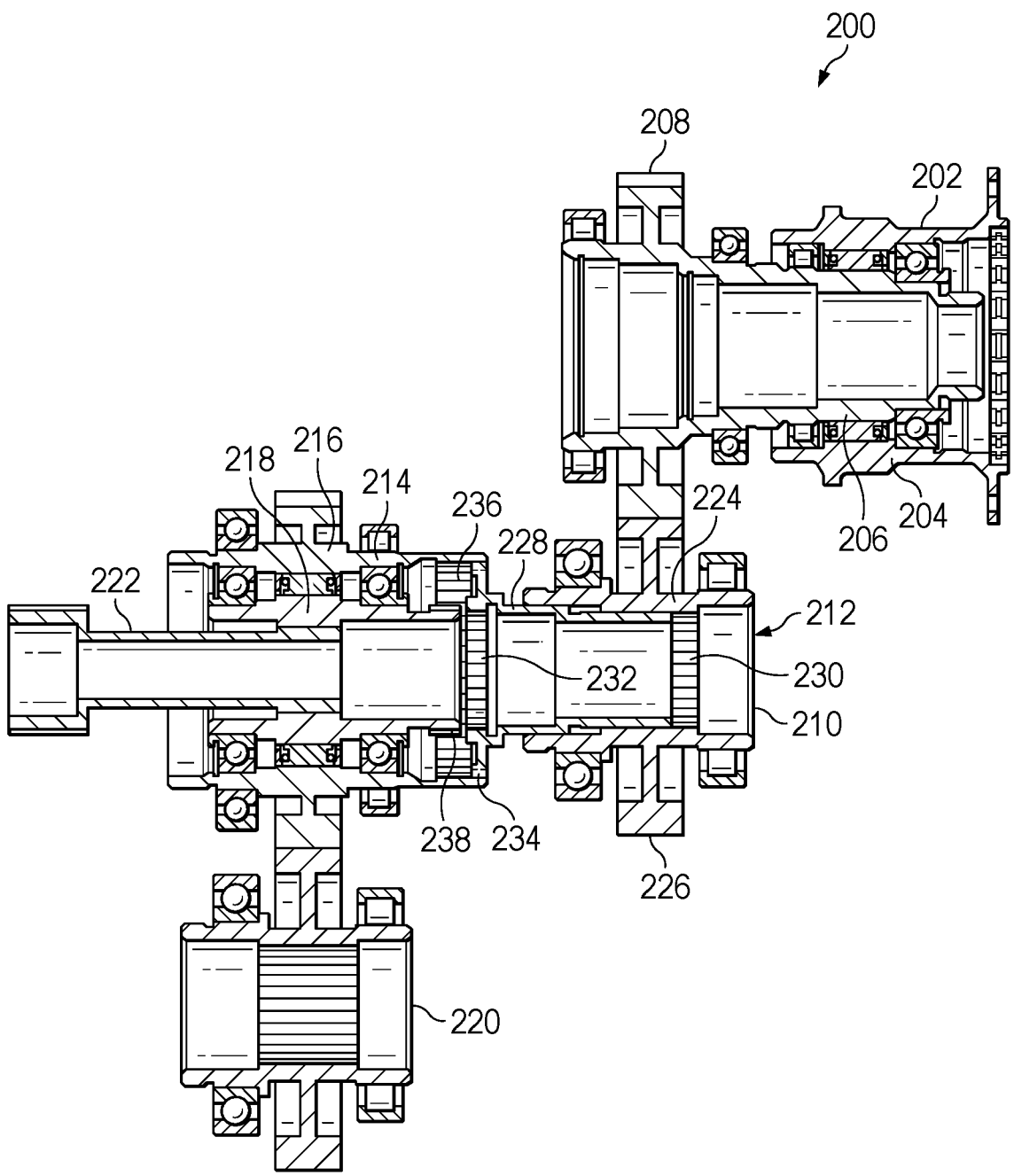
FIGS. 3A-3B are cross sectional views of a secondary gearbox including a tail rotor isolation system for rotorcraft in various operating configurations in accordance with embodiments of the present disclosure.
Figure 3B:
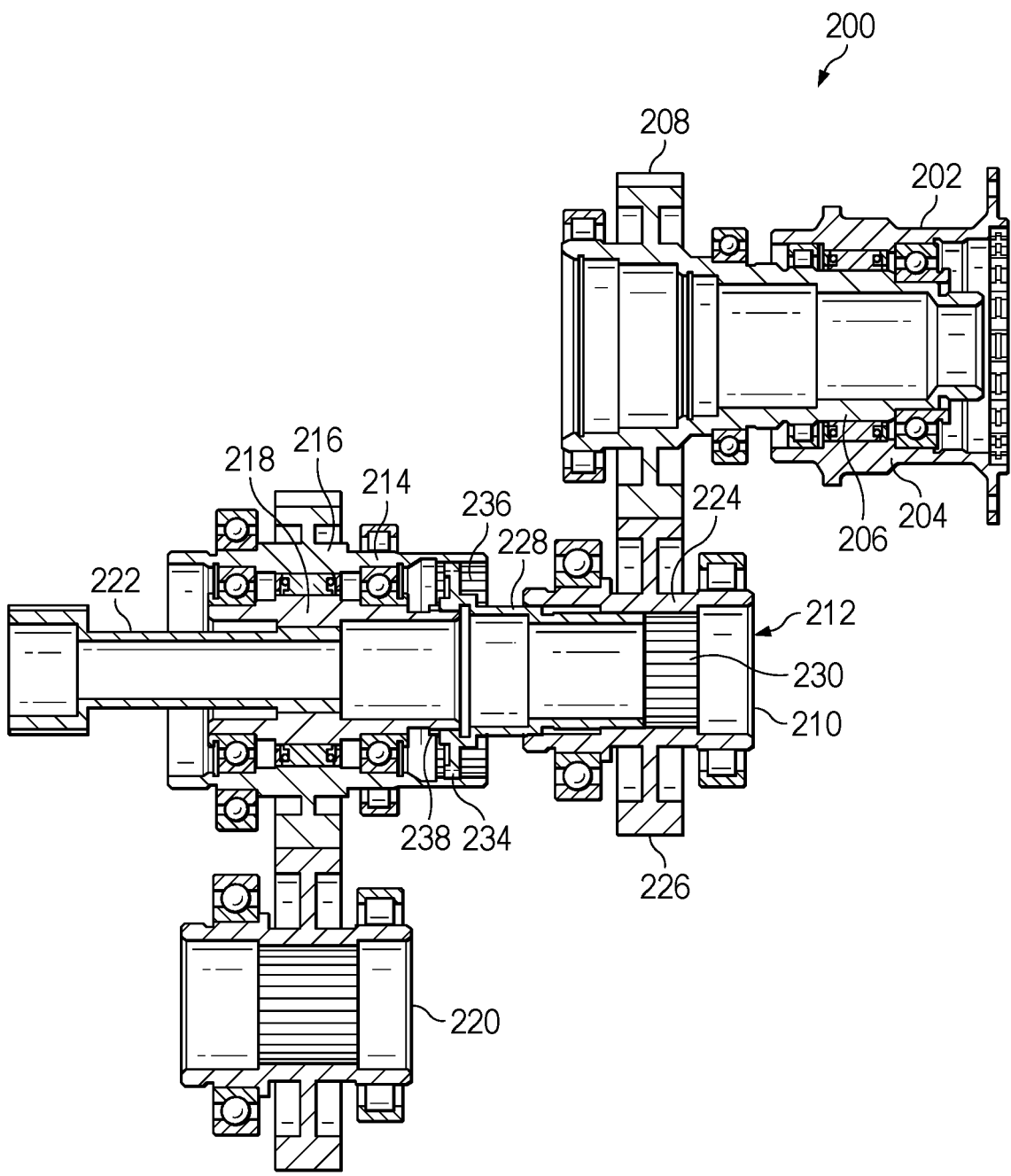

Referring next to FIGS. 3A-3B of the drawings, an embodiment of a secondary gearbox 200 will be discussed in greater detail. Secondary gearbox 200 may be representative of secondary gearbox 42 and/or secondary gearbox 112. Secondary gearbox 200 includes a freewheeling unit depicted as sprag clutch 202 that acts as a one-way clutch enabling a driving mode in which torque from the secondary engine 110 (see FIGS. 4A-4D) is coupled through sprag clutch 202 from an input race 204 to an output race 206. In the illustrated embodiment, output race 206 is coupled to an output gear 208 that provides torque to an isolation assembly 210. Sprag clutch 202 has an overrunning mode in which secondary engine 110 is decoupled from torque transfer through sprag clutch 202 when the rotating speed of input race 204 is less than the rotating speed of output race 206. Operating sprag clutch 202 in the overrunning mode allows, for example, the main rotor system to drive torque to the tail rotor system when secondary engine 110 is in standby mode or not operating, as discussed herein.

Secondary gearbox 200 includes a multimode clutch assembly 212 that is coupled to output gear 208 of sprag clutch 202. Multimode clutch assembly 212 includes a freewheeling unit depicted as sprag clutch 214, isolation assembly 210 coupled to sprag clutch 214 and an actuator coupled to isolation assembly 210 (see FIGS. 4A-4D). Sprag clutch 214 may function as a one-way clutch enabling a driving mode in which torque from secondary engine 110 is coupled through sprag clutch 214 from an input race 216 to an output race 218. In the illustrated embodiment, input race 216 is coupled to an input gear 220 that provides torque to the tail rotor system. When sprag clutch 214 is operating as a one-way clutch, sprag clutch 214 has an overrunning mode in which torque is not transferred through sprag clutch 214 when the rotating speed of input race 216 is less than the rotating speed of output race 218. In the illustrated embodiment, output race 218 is coupled to a driveshaft 222 from the main rotor system. Operating sprag clutch 214 in the overrunning mode allows, for example, the isolation of the tail rotor system from torque generated by the main rotor system.

Multimode clutch assembly 212 has a unidirectional torque transfer mode and a bidirectional torque transfer mode. In the illustrated embodiment, isolation assembly 210 includes an outer housing 224 integral with an input gear 226 and a splined adaptor 228 that is disposed within outer housing 224. A set of outer splines (not visible) of splined adaptor 228 form a splined coupling with a set of inner splines 230 of outer housing 224 such that splined adaptor 228 is rotatable with outer housing 224 and translatable relative to outer housing 224. In addition, splined adaptor 228 has a set of inner splines 232 and a set of outer splines (not visible) on a flanged end 234 thereof. The outer splines mesh with a set of inner splines 236 to form a splined coupling with input race 216 of sprag clutch 214. Inner splines 232 selectively mesh with a set of outer splines 238 to form a splined coupling with output race 218 of sprag clutch 214.

As best seen in FIG. 3A, isolation assembly 210 is in a partially engaged position wherein splined adaptor 228 has a splined coupling with input race 216 of sprag clutch 214 and is decoupled from output race 218 of sprag clutch 214. In this configuration, sprag clutch 214 acts as a one-way clutch enabling the driving mode in which torque transfers from input race 216 to output race 218 and the overrunning mode in which torque does not transfer from output race 218 to input race 216, thereby isolating torque generated by the main rotor system from the tail rotor system. When sprag clutch 214 is acting as a one-way clutch, multimode clutch assembly 212 is in its unidirectional torque transfer mode.

As best seen in FIG. 3B, isolation assembly 210 has been shifted from the partially engaged position to a fully engaged position. In the fully engaged position, splined adaptor 228 has a splined coupling with input race 216 of sprag clutch 214 and a splined coupling with output race 218 of sprag clutch 214 which couples input race 216 to output race 218 and functionally forms a connected shaft. In this configuration, isolation assembly 210 prevent sprag clutch 214 from operating in the overrunning mode which causes multimode clutch assembly 212 to operate in its bidirectional torque transfer mode. In the bidirectional torque transfer mode of multimode clutch assembly 212, torque can be driven from input race 216 to output race 218 or from output race 218 to input race 216 enabling, for example, torque generated by the main rotor system to drive the tail rotor system.

Figure 4A:
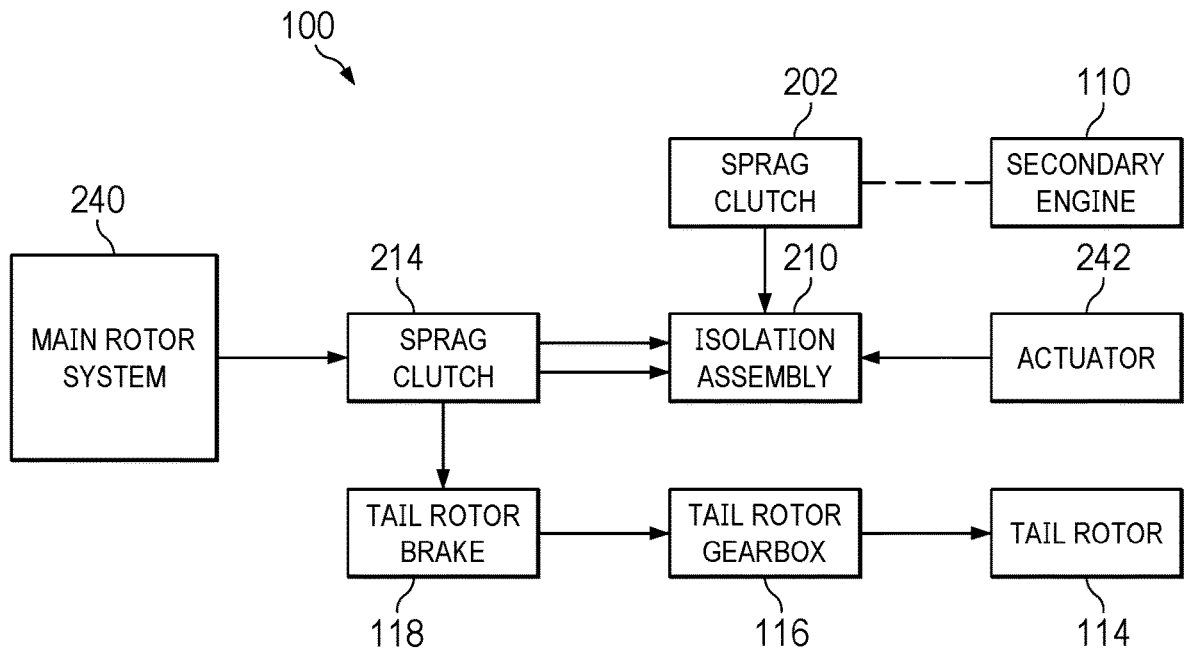
FIGS. 4A-4D are block diagrams of mechanical systems including a tail rotor isolation system for rotorcraft in various operating configurations in accordance with embodiments of the present disclosure.

The operation of secondary gearbox 200 will now be described with reference to FIGS. 4A-4D. In FIG. 4A, systems 100 are in the normal flight configuration and/or the high efficiency configuration in which secondary engine 110 has been shut down or placed in standby mode, as indicated by the dashed lines between secondary engine 110 and sprag clutch 202, while main rotor system 240 provides power for all components as indicated by the arrows between main rotor system 240, sprag clutch 214, isolation assembly 210, sprag clutch 202 and the components of the tail rotor system; namely, tail rotor 114, tail rotor gearbox 116 and tail rotor brake 118. During all flight configurations including the normal flight configuration, isolation assembly 210 is in the fully engaged position with sprag clutch 214 as indicated by the double arrows between isolation assembly 210 and sprag clutch 214 as well as the arrow from actuator 242 to isolation assembly 210. With isolation assembly 210 in the fully engaged position, multimode clutch assembly 212 is operating in its bidirectional torque transfer mode which enables torque generated by the main rotor system 240 to drive the tail rotor system through sprag clutch 214.

Figure 4B:
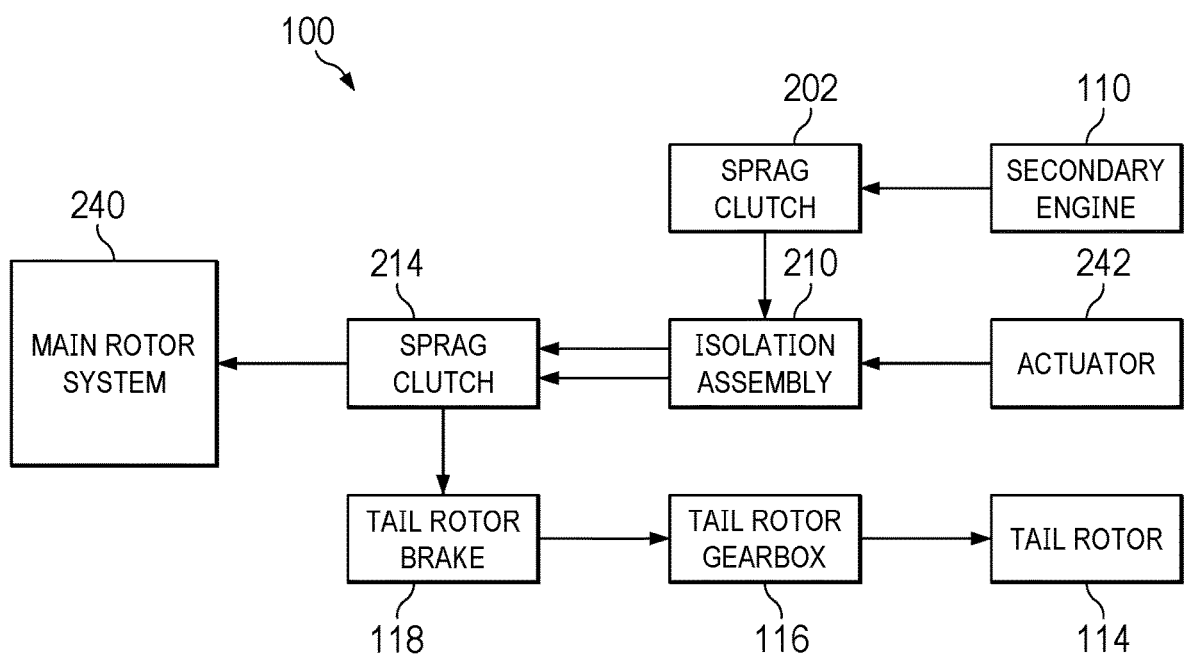

In FIG. 4B, systems 100 are depicted in the secondary engine ramp up configuration as indicated by the arrow from secondary engine 110 to sprag clutch 202 as well as the arrows between sprag clutch 202, isolation assembly 210, sprag clutch 214, main rotor system 240 and the components of the tail rotor system which are now driven by torque from secondary engine 110 when to rotating speed of secondary engine 110 matches that of main rotor system 240. This configuration may be considered as the enhanced power configuration of the rotorcraft. In the illustrated embodiment, this configuration is also required when it is desired to isolate the tail rotor system from main rotor system torque. Specifically, once the rotating speeds of secondary engine 110 and main rotor system 240 are matched with input race 216 rotating at the same speed as output race 218 of sprag clutch 214, isolation assembly 210 can now be actuated from the fully engaged position to the partially engaged position.

Figure 4C:
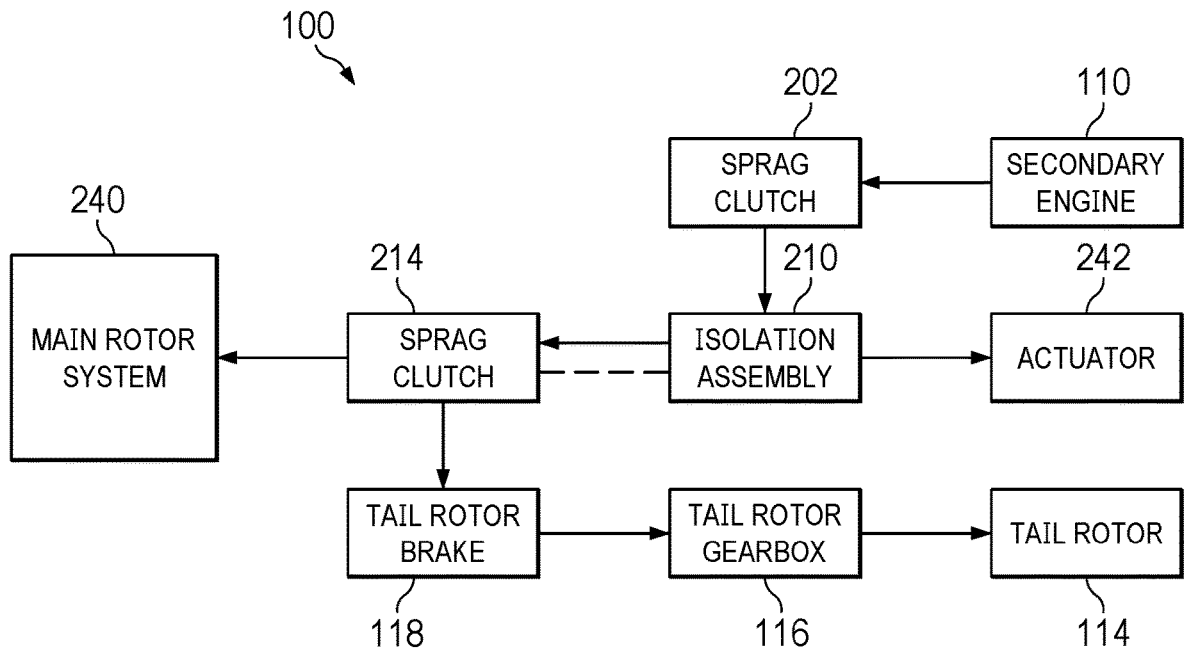

In FIG. 4C, systems 100 are depicted in a tail rotor isolation configuration which preferably occurs after the rotorcraft has landed. This configuration is achieved by linear operation of actuator 242 to shift splined adaptor 228 from the fully engaged position (see FIG. 3B) to the partially engaged position (see FIG. 3A). The operation of actuator 242 may be pilot controlled and/or may be automated by the flight control computer of the rotorcraft. In the illustrated embodiment, splined adaptor 228 is shifted between the fully engaged and partially engaged positions responsive to linear forces supplied by actuator 242, which may be generated mechanically, electrically, hydraulically, pneumatically and/or combinations thereof or by other suitable actuation signaling means. The partially engaged position of isolation assembly 210 is indicated by the single arrow and dashed line between isolation assembly 210 and sprag clutch 214 as well as the arrow from isolation assembly 210 to actuator 242. In this configuration, torque from secondary engine 110 is driving the tail rotor system as indicated by the arrows between secondary engine 110, sprag clutch 202, isolation assembly 210, sprag clutch 214 and the components of the tail rotor system. With isolation assembly 210 in the partially engaged position, multimode clutch assembly 212 is operating in its unidirectional torque transfer mode which enables the overrunning mode of sprag clutch 214, thereby isolating the tail rotor system from torque generated by the main rotor system 240.

Figure 4D:
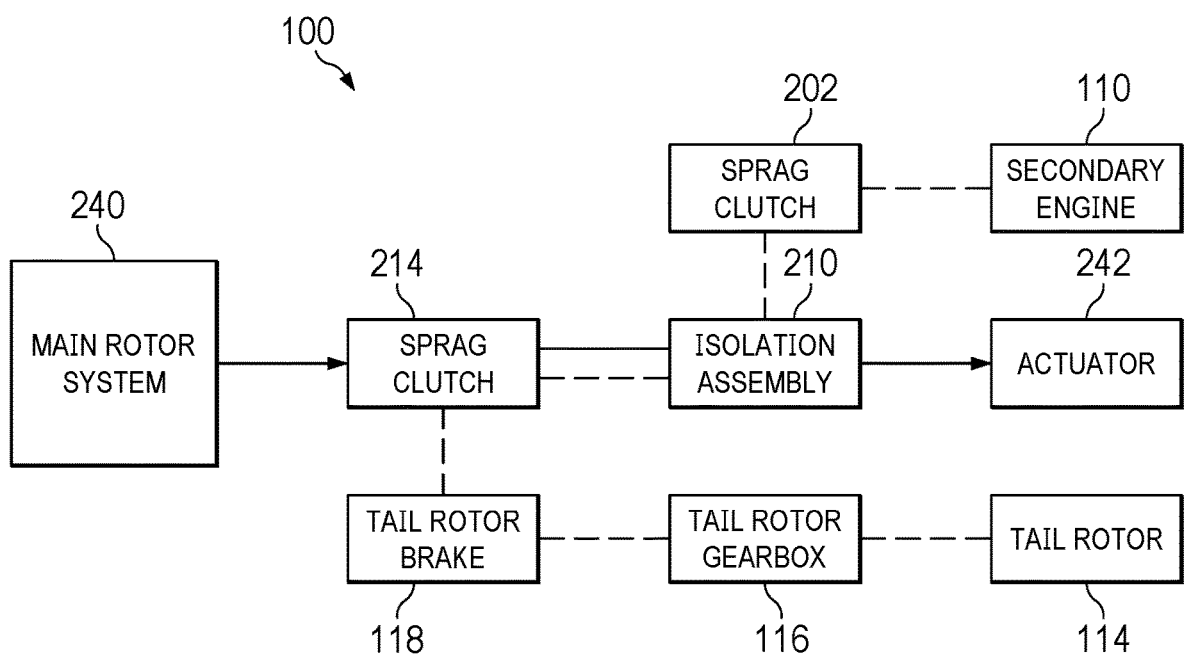

In FIG. 4D, systems 100 are depicted in a ground safety configuration in which the main rotor system 240 remains in operation as in indicated by the arrow from main rotor system 240 to sprag clutch 214 and in which secondary engine 110 and tail rotor 114 are not operating as indicated by the dashed lines between secondary engine 110, sprag clutch 202, isolation assembly 210, sprag clutch 214 and the components of the tail rotor system. Isolation assembly 210 remains in the partially engaged position such that multimode clutch assembly 212 is operating in its unidirectional torque transfer mode which enables the overrunning mode of sprag clutch 214 and the isolation of the tail rotor system from torque generated by main rotor system 240. Once secondary engine 110 is powered down, tail rotor brake 118 may be used to rapidly stop the rotation of tail rotor 114 and lock tail rotor 114 in a non-rotating state, thereby enhancing the safety of a rotorcraft utilizing the tail rotor isolation system of the present disclosure.

When the rotorcraft is ready to return to flight modes, secondary engine 110 is ramped up together with the tail rotor system which can be represented by FIG. 4C. When secondary engine 110 is rotating at the same speed as main rotor system 240, actuator 242 may be used to shift splined adaptor 228 from the partially engaged position (see FIG. 3A) to the fully engaged position (see FIG. 3B) which can be represented by FIG. 4B. With isolation assembly 210 in the fully engaged position, multimode clutch assembly 212 is operating in its bidirectional torque transfer mode which enables torque generated by the main rotor system 240 to drive the tail rotor system. Thereafter, the rotorcraft may operate in the enhanced power configuration which can be represented by FIG. 4B and/or the high efficiency configuration which can be represented by FIG. 4A.

Figure 5A:
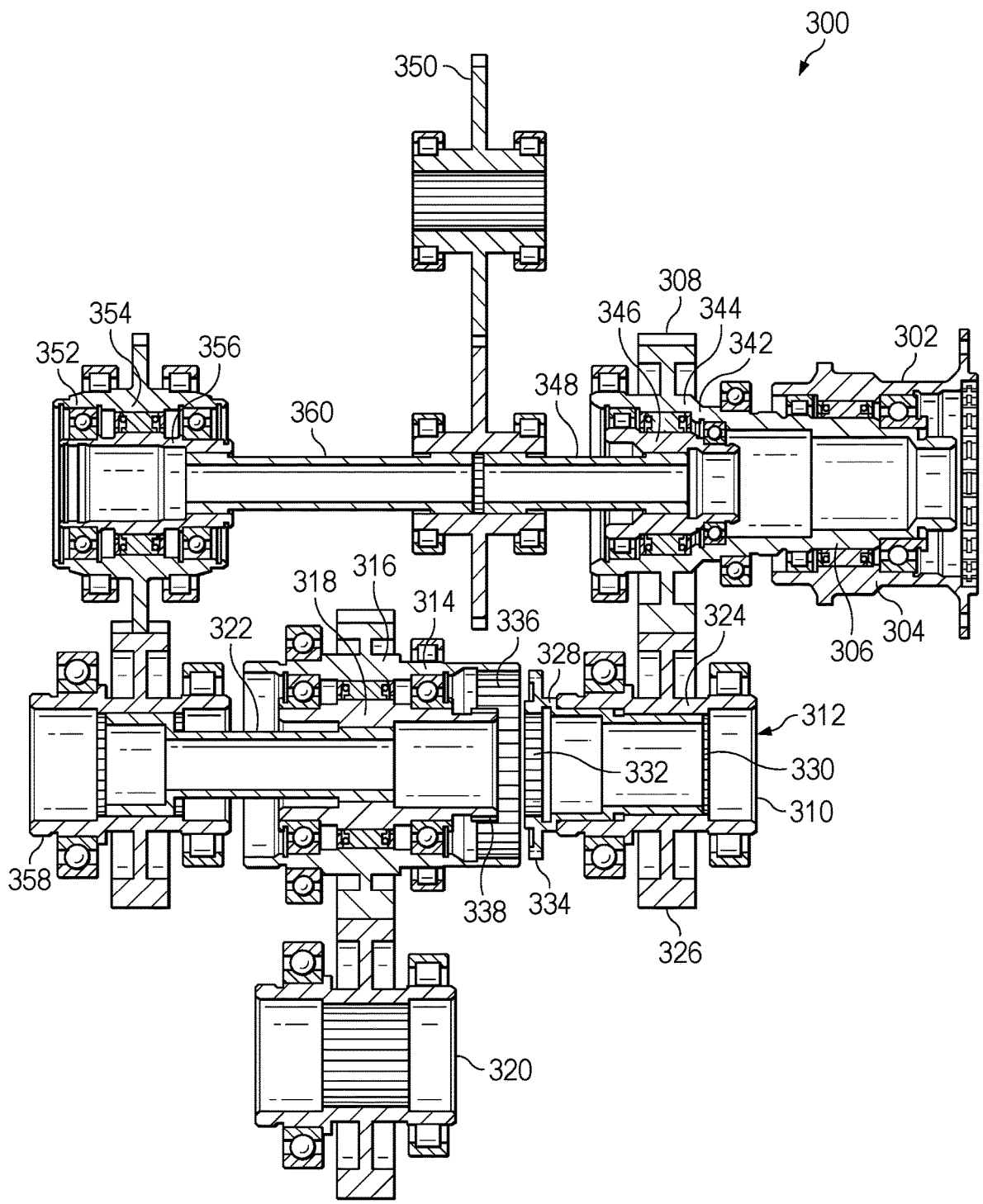
FIGS. 5A-5C are cross sectional views of a secondary gearbox including a tail rotor isolation system for rotorcraft in various operating configurations in accordance with embodiments of the present disclosure.
Figure 5B:
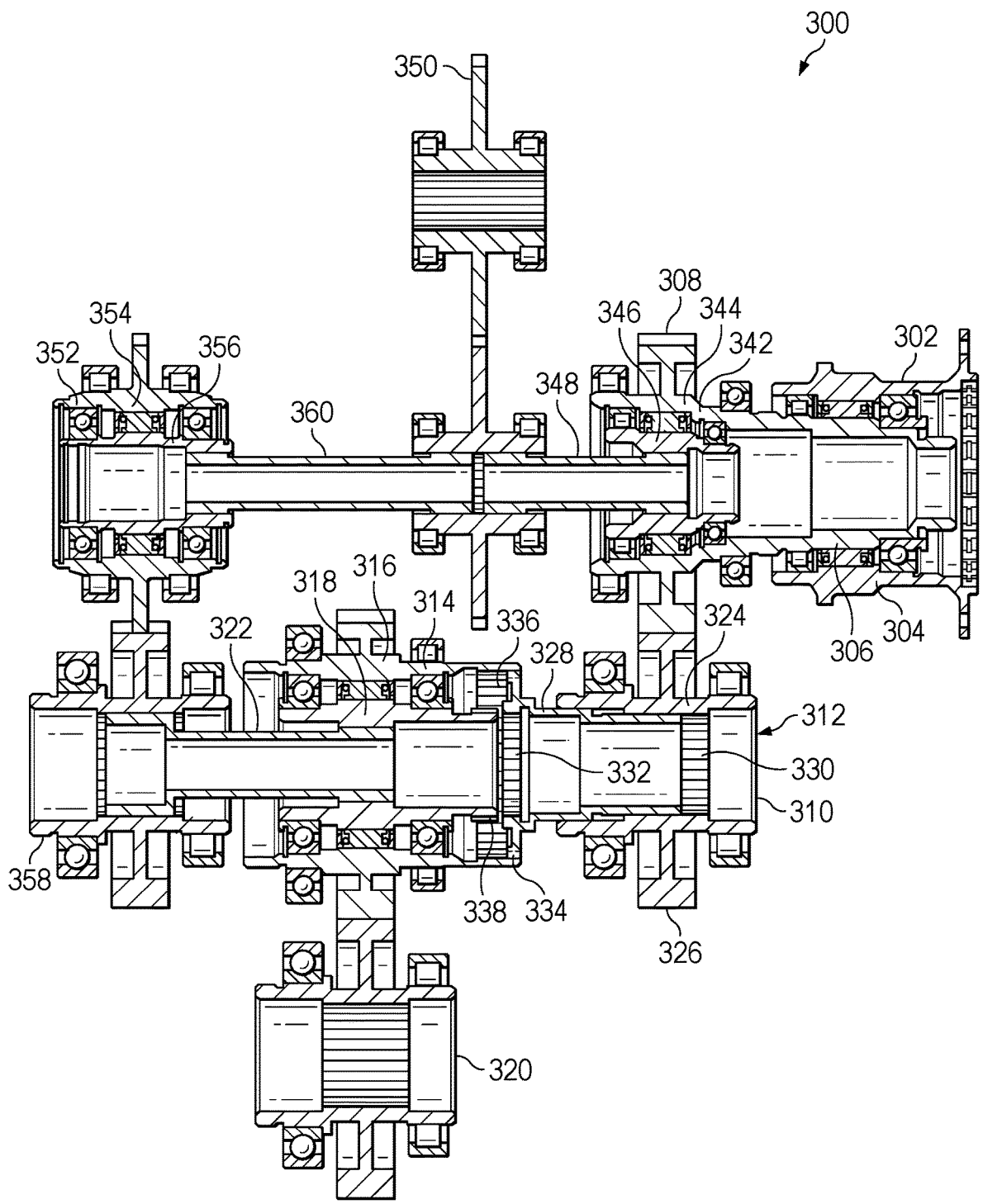
Figure 5C:
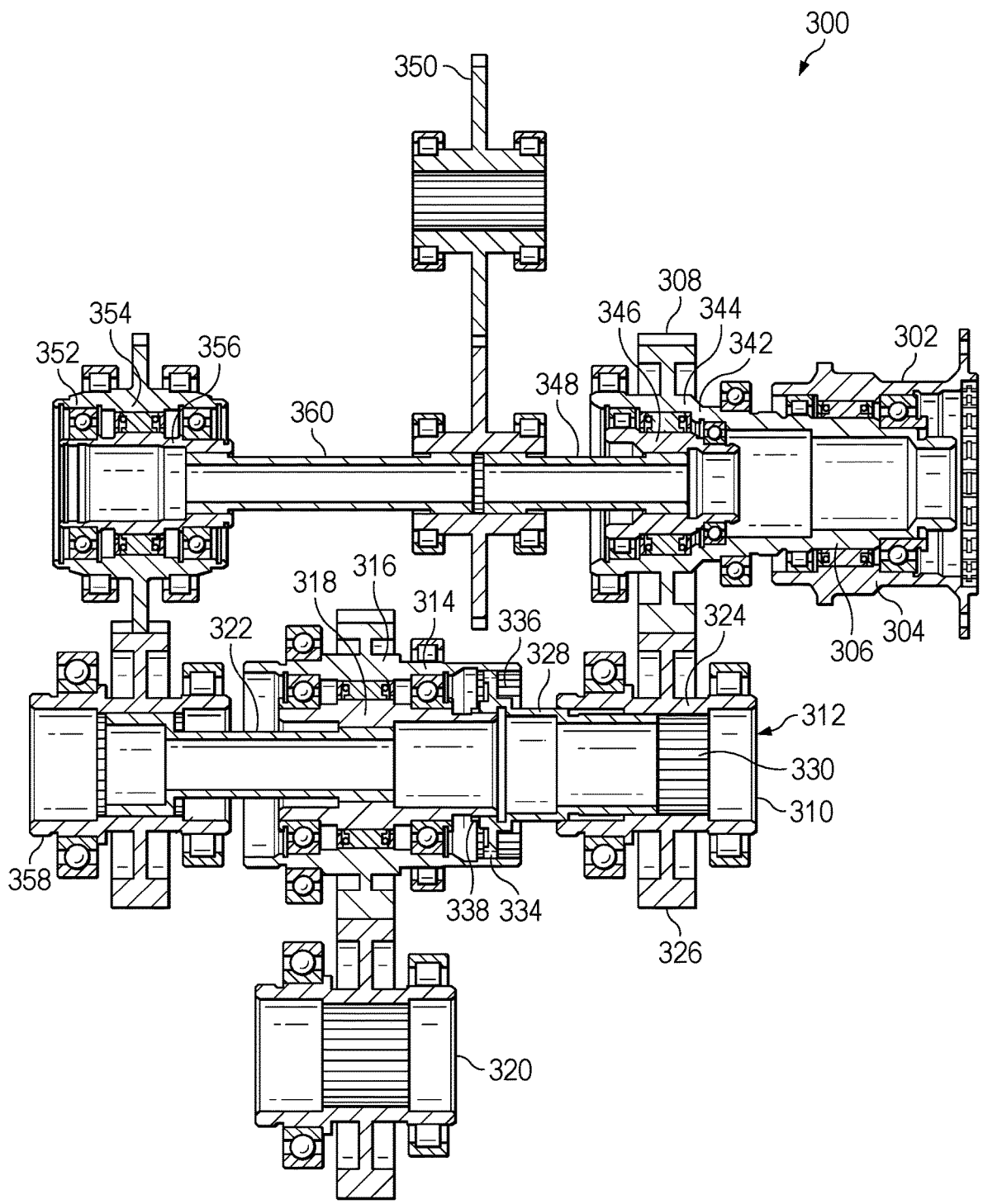

Referring next to FIGS. 5A-5C of the drawings, another embodiment of a secondary gearbox 300 will be discussed in greater detail. Secondary gearbox 300 may be representative of secondary gearbox 42 and/or secondary gearbox 112. Secondary gearbox 300 includes a freewheeling unit depicted as sprag clutch 302 that acts as a one-way clutch enabling a driving mode in which torque from the secondary engine 110 (see FIGS. 6A-6F) is coupled through sprag clutch 302 from an input race 304 to an output race 306. In the illustrated embodiment, output race 306 is coupled to an output gear 308 that provides torque to an isolation assembly 310. Sprag clutch 302 has an overrunning mode in which secondary engine 110 is decoupled from torque transfer through sprag clutch 302 when the rotating speed of input race 304 is less than the rotating speed of output race 306. Operating sprag clutch 302 in the overrunning mode allows, for example, the main rotor system to drive torque to accessories and the tail rotor system when secondary engine 110 is in standby mode or not operating, as discussed herein.

Secondary gearbox 300 includes a multimode clutch assembly 312 that is coupled to output gear 308 of sprag clutch 302. Multimode clutch assembly 312 includes a freewheeling unit depicted as sprag clutch 314, isolation assembly 310 coupled to sprag clutch 314 and an actuator coupled to isolation assembly 310 (see FIGS. 6A-6F). Sprag clutch 314 may function as a one-way clutch enabling a driving mode in which torque from secondary engine 110 is coupled through sprag clutch 314 from an input race 316 to an output race 318. In the illustrated embodiment, input race 316 is coupled to an input gear 320 that provides torque to the tail rotor system. When sprag clutch 314 is operating as a one-way clutch, sprag clutch 314 has an overrunning mode in which torque is not transferred through sprag clutch 314 when the rotating speed of input race 316 is less than the rotating speed of output race 318. In the illustrated embodiment, output race 318 is coupled to a driveshaft 322 from the main rotor system. Operating sprag clutch 314 in the overrunning mode allows, for example, the isolation of the tail rotor system from torque generated by the main rotor system.

Multimode clutch assembly 312 has a unidirectional torque transfer mode and a bidirectional torque transfer mode. In the illustrated embodiment, isolation assembly 310 includes an outer housing 324 integral with an input gear 326 and a splined adaptor 328 that is disposed within outer housing 324. A set of outer splines (not visible) of splined adaptor 328 form a splined coupling with a set of inner splines 330 of outer housing 324 such that splined adaptor 328 is rotatable with outer housing 324 and translatable relative to outer housing 324. In addition, splined adaptor 328 has a set of inner splines 332 and a set of outer splines (not visible) on a flanged end 334 thereof. The outer splines selectively mesh with a set of inner splines 336 to form a splined coupling with input race 316 of sprag clutch 314. Inner splines 332 selectively mesh with a set of outer splines 338 to form a splined coupling with output race 318 of sprag clutch 314.

As best seen in FIG. 5A, isolation assembly 310 is in a disengaged position wherein splined adaptor 328 is decoupled from input race 316 of sprag clutch 314 and decoupled from output race 318 of sprag clutch 314. In this configuration, sprag clutch 314 acts as a one-way clutch enabling the driving mode in which torque transfers from input race 316 to output race 318 and the overrunning mode in which torque does not transfer from output race 318 to input race 316 isolating torque generated by the main rotor system from the tail rotor system.

As best seen in FIG. 5B, isolation assembly 310 has been shifted from the disengaged position to a partially engaged position. In the partially engaged position, splined adaptor 328 has a splined coupling with input race 316 of sprag clutch 314 and is decoupled from output race 318 of sprag clutch 314. In this configuration, sprag clutch 314 acts as a one-way clutch enabling the driving mode in which torque transfers from input race 316 to output race 318 and the overrunning mode in which torque does not transfer from output race 318 to input race 316 isolating torque generated by the main rotor system from the tail rotor system. When sprag clutch 314 is acting as a one-way clutch, multimode clutch assembly 312 is in its unidirectional torque transfer mode.

As best seen in FIG. 5C, isolation assembly 310 has been shifted from the partially engaged position to a fully engaged position. In the fully engaged position, splined adaptor 328 has a splined coupling with input race 316 of sprag clutch 314 and a splined coupling with output race 318 of sprag clutch 314 which couples input race 316 to output race 318 and functionally forms a connected shaft. In this configuration, isolation assembly 310 prevent sprag clutch 314 from operating in the overrunning mode which causes multimode clutch assembly 312 to operate in its bidirectional torque transfer mode. In the bidirectional torque transfer mode of multimode clutch assembly 312, torque can be driven from input race 316 to output race 318 or from output race 318 to input race 316 enabling, for example, torque generated by the main rotor system to drive the tail rotor system.

Secondary gearbox 300 also provides multiple torque paths to power accessories 120 (see FIGS. 6A-6F). Secondary gearbox 300 includes a freewheeling unit depicted as sprag clutch 342 that acts as a one-way clutch enabling a driving mode in which torque from output race 306 of sprag clutch 302 is coupled through sprag clutch 342 from an input race 344 to an output race 346. In the illustrated embodiment, output race 346 is coupled to a driveshaft 348 that provides torque to an accessories gear train 350 that powers accessories 120. Sprag clutch 342 has an overrunning mode in which secondary engine 110 is decoupled from torque transfer through sprag clutch 342 when the rotating speed of input race 344 is less than the rotating speed of output race 346. Operating sprag clutch 342 in the overrunning mode allows, for example, the main rotor system to drive torque to accessories 120 when secondary engine 110 is in standby mode or not operating.

Secondary gearbox 300 includes a freewheeling unit depicted as sprag clutch 352 that acts as a one-way clutch enabling a driving mode in which torque from the main rotor system through input gear 358 is coupled through sprag clutch 352 from an input race 354 to an output race 356. In the illustrated embodiment, output race 356 is coupled to a driveshaft 360 that provides torque to accessories gear train 350 that powers accessories 120. Sprag clutch 352 has an overrunning mode in which the main rotor system is decoupled from torque transfer through sprag clutch 352 when the rotating speed of input race 354 is less than the rotating speed of output race 356. Operating sprag clutch 352 in the overrunning mode allows, for example, secondary engine 110 to drive torque to accessories 120 when the main rotor system is not operating.

Figure 6A:
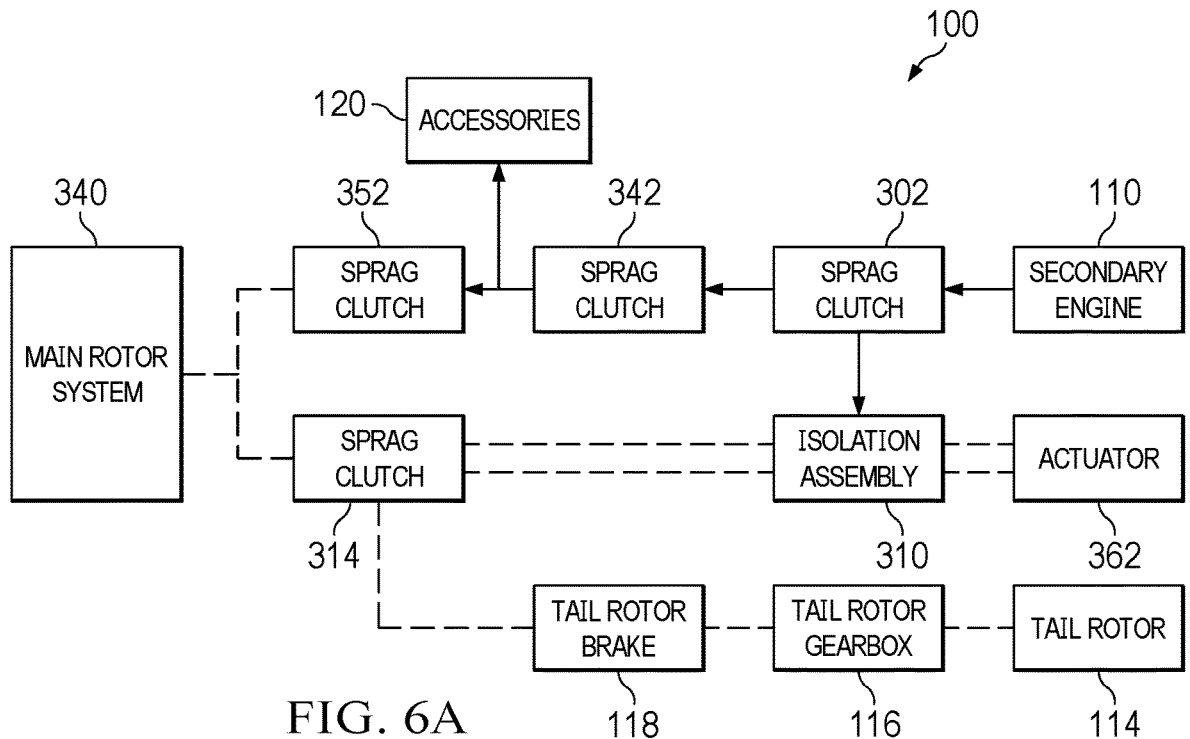
FIGS. 6A-6F are block diagrams of mechanical systems including a tail rotor isolation system for rotorcraft in various operating configurations in accordance with embodiments of the present disclosure.

The operation of secondary gearbox 300 will now be described with reference to FIGS. 6A-6F. In FIG. 6A, systems 100 are in the preflight configuration in which secondary engine 110 operating as an auxiliary power unit to provide torque that powers accessories 120 as indicated by the arrows between secondary engine 110, sprag clutch 302, sprag clutch 342 and accessories 120. In addition, sprag clutch 352 is operating in the overrunning mode. Isolation assembly 310 is in the disengaged position (FIG. 5A) so no torque is being transferred to sprag clutch 314 as indicated by the double dashed lines between isolation assembly 310 and sprag clutch 314 as well as the double dashed lines between isolation assembly 310 and actuator 362. In this configuration, the tail rotor system is isolated from torque generated by secondary engine 110. Main rotor system 340 has not yet been started up as indicated by the dashed lines between main rotor system 340 and sprag clutches 314, 352.

Figure 6B:
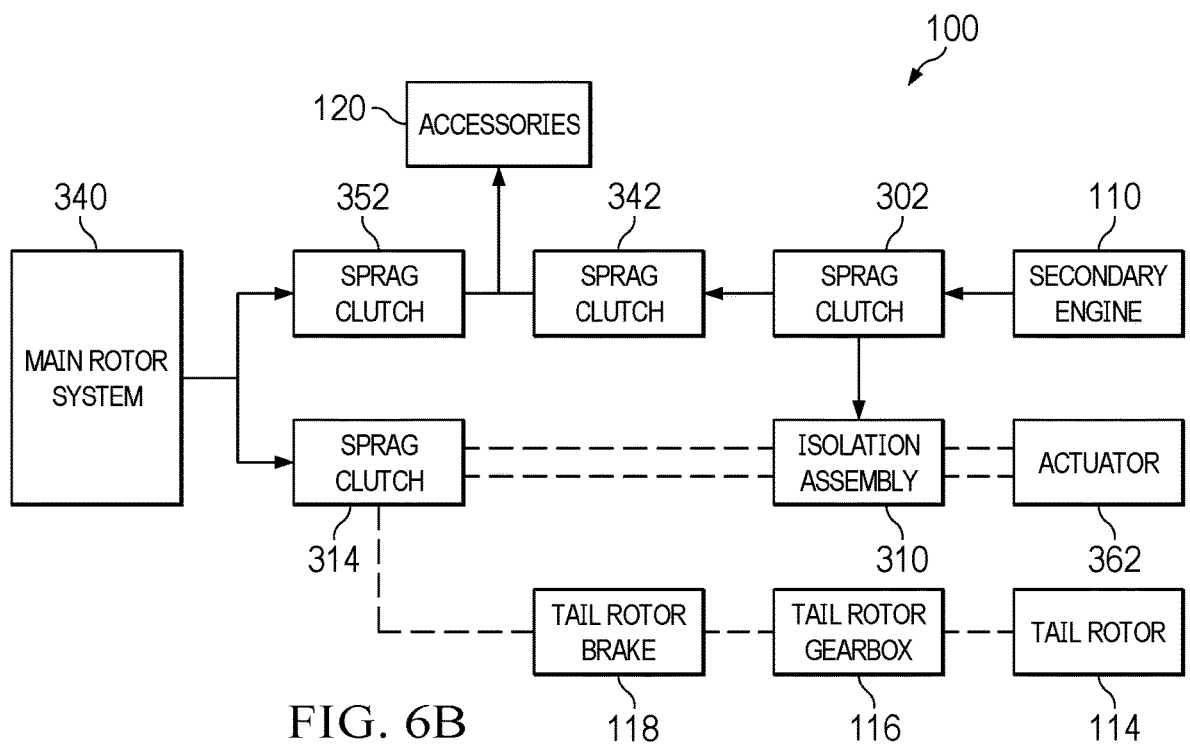

In FIG. 6B, systems 100 are in the main rotor system ramp up configuration in which secondary engine 110 continues to operate as an auxiliary power unit to provide torque that powers accessories 120 as indicated by the arrows between secondary engine 110, sprag clutch 302, sprag clutch 342 and accessories 120. Main rotor system 340 is operating as indicated by the arrows from main rotor system 340 to sprag clutches 314, 352. When the rotation speed of main rotor system 340 matches or exceeds that of secondary engine 110, sprag clutch 352 provides power to accessories 120 as indicated by the arrow from sprag clutch 352 to accessories 120. Sprag clutch 314 is operating in its overrunning mode such that torque from main rotor system 340 is not transferred to the tail rotor system as indicated by the dashed lines between sprag clutch 314 and the components of the tail rotor system. In addition, isolation assembly 310 remains in the disengaged position (FIG. 5A) so no torque is being transferred to sprag clutch 314 as indicated by the double dashed lines between isolation assembly 310 and sprag clutch 314 as well as the double dashed lines between isolation assembly 310 and actuator 362. In this configuration, the tail rotor system is isolated from torque generated by secondary engine 110 and from main rotor system 340. This configuration is considered to be a ground safety configuration in which tail rotor 114 is not rotating. Tail rotor brake 118 may be engaged to lock tail rotor 114 in the non-rotating state.

Figure 6C:
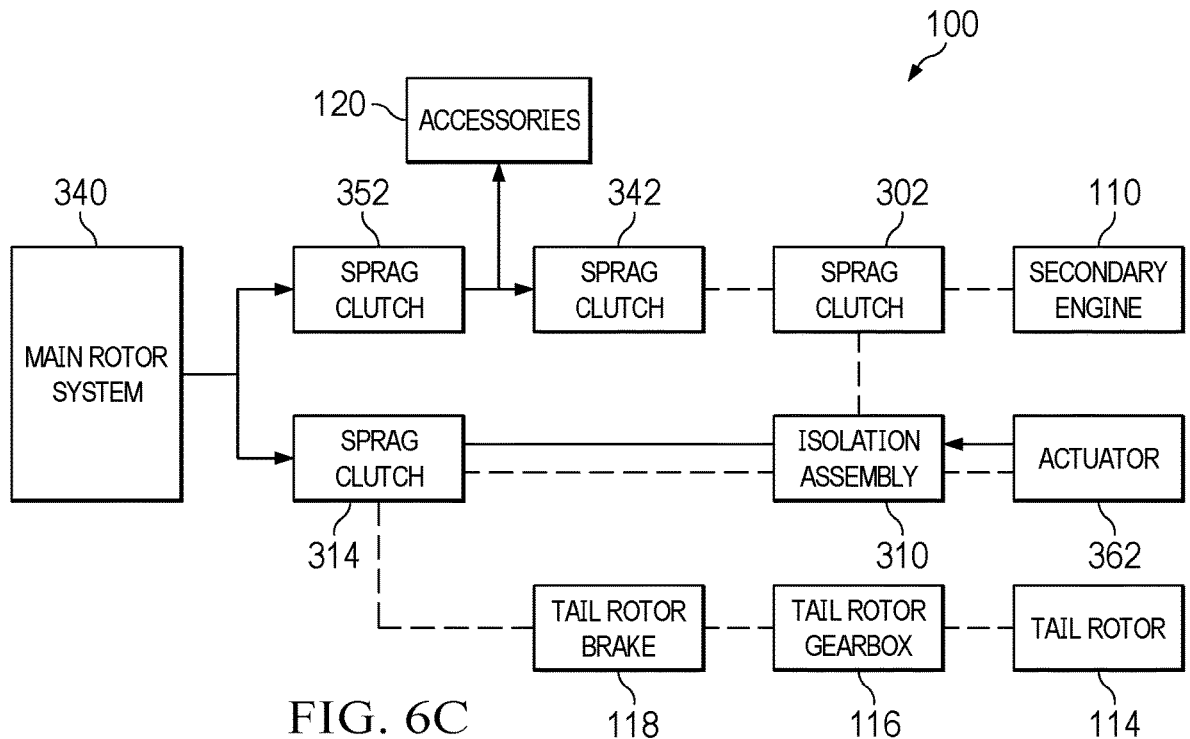

In FIG. 6C, systems 100 are depicted in an auxiliary power off configuration as indicated by the dashed line between secondary engine 110, sprag clutch 302, sprag clutch 342 and isolation assembly 310. Main rotor system 340 continues to operate as indicated by the arrows from main rotor system 340 to sprag clutches 314, 352 and accessories 120. Sprag clutch 342 is operating in its overrunning mode. In addition, the tail rotor system remains isolated from torque from main rotor system 340 with sprag clutch 314 operating in the overrunning mode as indicated by the dashed lines between sprag clutch 314 and the components of the tail rotor system. As both isolation assembly 310 and input race 316 are not rotating, splined adaptor 328 may be shifted from the disengaged position (FIG. 5A) to the partially engaged position (FIG. 5B) which couples the outer splines of splined adaptor 328 with inner splines 336 of input race 316 but does not couple inner splines 332 with outer splines 338 of output race 318, as indicated by the solid line and dashed line between isolation assembly 310 and sprag clutch 314 as well as the arrow and dashed line between actuator 362 and isolation assembly 310. Optionally, tail rotor brake 118 may be engaged as a further safety measure against rotation of tail rotor 114 and if engaged, should be disengaged prior to the entering the secondary engine ramp up configuration described next.

Figure 6D:
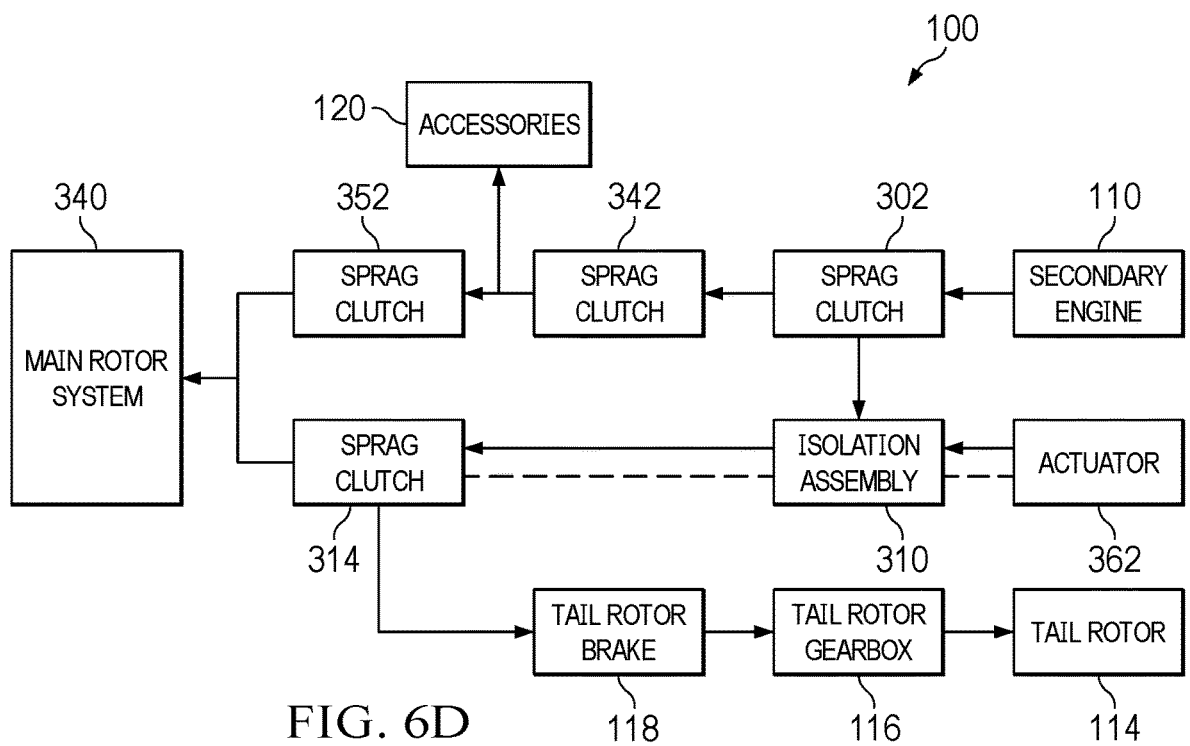

In FIG. 6D, systems 100 are depicted in the secondary engine ramp up configuration as indicated by the arrows between secondary engine 110, sprag clutch 302, sprag clutch 342 and isolation assembly 310. As isolation assembly 310 is in the partially engaged position, tail rotor 114 ramps up with secondary engine 110 as indicated by the arrows between sprag clutch 314 and the components of the tail rotor system. When secondary engine 110 is fully ramped up to match the rotating speed of main rotor system 340, secondary engine 110 may provide torque to main rotor system 340 as indicated by the arrow between sprag clutch 314 and main rotor system 340.

Figure 6E:
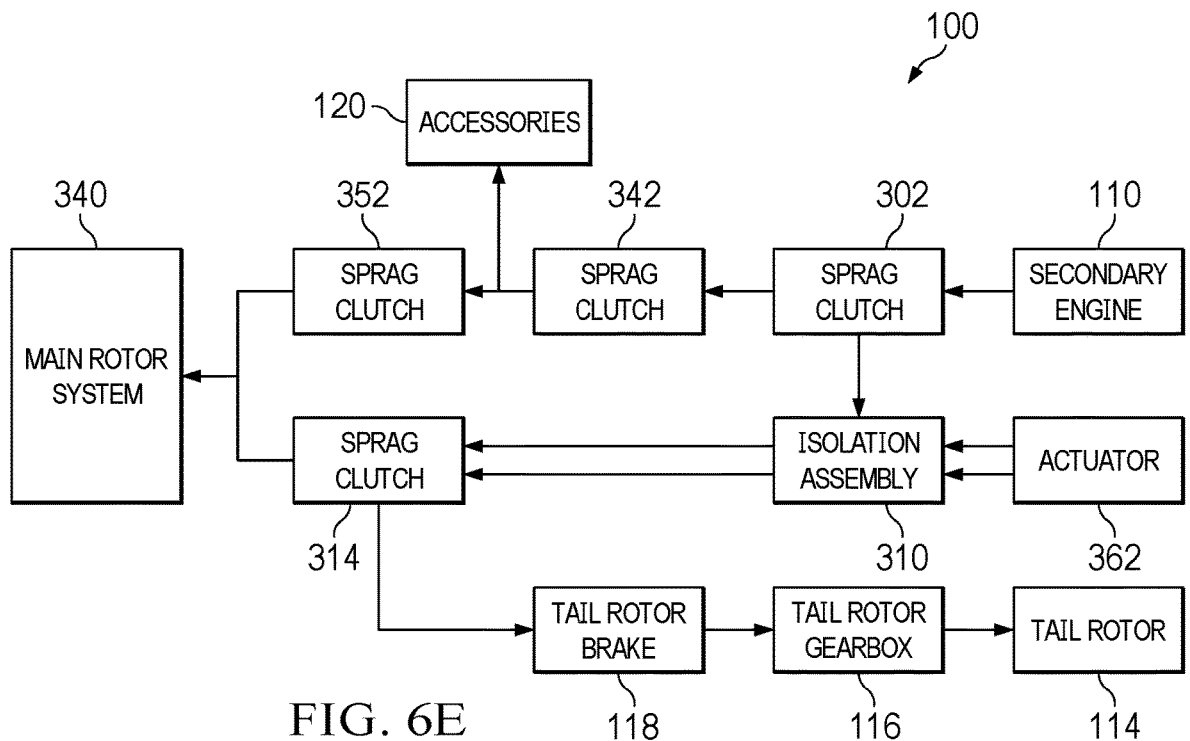
Figure 6F:
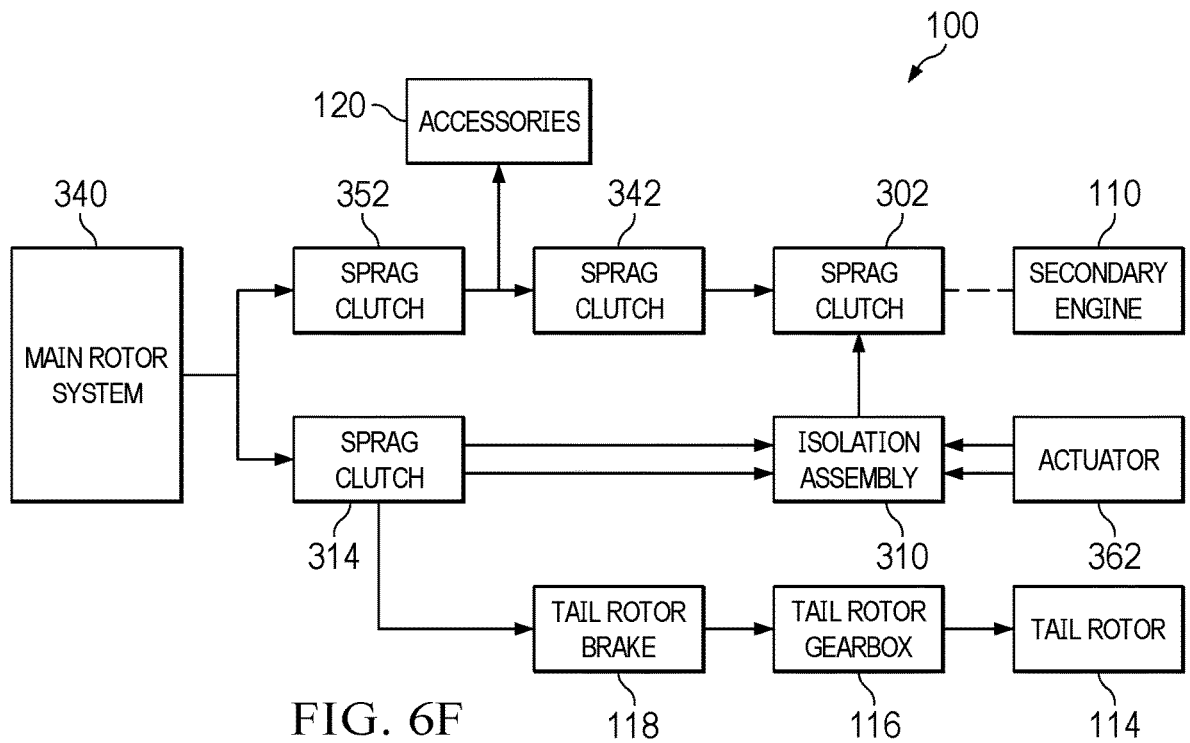

In FIG. 6E, systems 100 are depicted in the tail rotor coupling configuration in which secondary engine 110 continues to drive sprag clutches 302, 342, 352, insolation assembly 310, sprag clutch 314 and the tail rotor system as indicated by the arrows therebetween. With input race 316 and output race 318 of sprag clutch 314 rotating at the same speed, splined adaptor 328 may be shifted from the partially engaged position to the fully engaged position responsive to operation of actuator 362 as indicated by the dual arrows between isolation assembly 310 and sprag clutch 314 as well as the dual arrows from actuator 362 to isolation assembly 310. Splined adaptor 328 couples input race 316 to output race 318 which also couples main rotor system 340 to the tail rotor system as indicated by the arrows between sprag clutch 314 and the components of the tail rotor system. This configuration of systems 100 may represent the enhanced power configuration.

In FIG. 2F, systems 100 are depicted in a high efficiency configuration in which secondary engine 110 has been shut down or placed in standby mode, as indicated by the dashed lines between secondary engine 110 and sprag clutch 302, while main rotor system 340 provides power for all components as indicated by the arrows between main rotor system 340, sprag clutches 314, 352, 342, 302, accessories 120, isolation assembly 310 and the components of the tail rotor system. Sprag clutch 302 is in its overrunning mode. Isolation assembly 310 remains in the fully engaged position as indicated by the dual arrows between isolation assembly 310 and sprag clutch 314 as well as the dual arrows from actuator 362 to isolation assembly 310. This configuration of systems 100 may represent the high efficiency or normal cruise configuration.

When the rotorcraft is ready to return to the ground safety configuration, secondary engine 110 is ramped up to match the rotating speed of main rotor system 340, which can be represented by FIG. 6E. Actuator 362 may then be used to shift splined adaptor 328 from the fully engaged position (FIG. 5C) to the partially engaged position (FIG. 5B) which isolates the tail rotor system from torque generated by main rotor system 340 and can be represented by FIG. 6D. Secondary engine 110 may now be powered down which also powers down tail rotor 114. Tail rotor brake 118 may be used to rapidly stop the rotation of tail rotor 114 and lock tail rotor 114 in a non-rotating state, placing the rotorcraft in the ground safety configuration, which can be represented by FIG. 6C.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tail rotor isolation system for rotorcraft having a main rotor system including a main engine, a main rotor gearbox and a main rotor, the tail rotor isolation system comprising:
a secondary engine;
first and second freewheeling units each having an input race and an output race such that torque applied to the input race is transferred to the output race in a driving mode and torque applied to the output race is not transferred to the input race in an overrunning mode, the input race of the first freewheeling unit coupled to the secondary engine, the output race of the second freewheeling unit coupled to the main rotor system;
an isolation assembly disposed between the first and second freewheeling units, the isolation assembly coupled to the output race of the first freewheeling unit, the isolation assembly having a fully engaged position in which the isolation assembly couples the input and output races of the second freewheeling unit and a partially engaged position in which the isolation assembly is coupled to the input race of the second freewheeling unit and decoupled from the output race of the second freewheeling unit; and
a tail rotor system coupled to the input race of the second freewheeling unit;
wherein, in the partially engaged position of the isolation assembly, the overrunning mode of the second freewheeling unit isolates the tail rotor system from torque generated by the main rotor system;
wherein, in the partially engaged position of the isolation assembly, the tail rotor system is coupled to torque generated by the secondary engine; and
wherein, in the fully engaged position of the isolation assembly, the tail rotor system is coupled to torque generated by the main rotor system and the secondary engine.

2. The tail rotor isolation system as recited in claim 1 wherein the secondary engine is configured to generate between 5 percent and 20 percent of the power of the main engine.

3. The tail rotor isolation system as recited in claim 1 wherein the secondary engine is configured to generate approximately the same amount of power as the main engine.

4. The tail rotor isolation system as recited in claim 1 wherein the secondary engine is a gas turbine engine.

5. The tail rotor isolation system as recited in claim 1 wherein the secondary engine is an electric motor.

6. The tail rotor isolation system as recited in claim 1 wherein the isolation assembly includes an outer housing and a splined adaptor that is disposed within the outer housing, rotatable with the outer housing and translatable relative to the outer housing between the fully engaged position and the partially engaged position with the second freewheeling unit.

7. The tail rotor isolation system as recited in claim 6 wherein the splined adaptor has a splined coupling with the input race of the second freewheeling unit in both the fully engaged position and the partially engaged position; and
wherein, the splined adaptor has a splined coupling with the output race of the second freewheeling unit in the fully engaged position and is decoupled from the output race of the second freewheeling unit in the partially engaged position.

8. The tail rotor isolation system as recited in claim 6 wherein the splined adaptor has outer splines and inner splines;
wherein, the outer splines of the splined adaptor have a splined coupling with inner splines of the input race of the second freewheeling unit in both the fully engaged position and the partially engaged position; and
wherein, the inner splines of the splined adaptor have a splined coupling with outer splines of the output race of the second freewheeling unit in the fully engaged position and are decoupled from the outer splines of the output race of the second freewheeling unit in the partially engaged position.

9. The tail rotor isolation system as recited in claim 6 further comprising an actuator coupled to the splined adaptor and configured to shift the splined adaptor between the fully engaged position and the partially engaged position with the second freewheeling unit.

10. The tail rotor isolation system as recited in claim 9 wherein the actuator is a linear actuator.

11. The tail rotor isolation system as recited in claim 9 wherein the actuator is one of a hydraulic actuator, an electromechanical actuator or a pneumatic actuator.

12. The tail rotor isolation system as recited in claim 1 wherein the tail rotor system further comprises a tail rotor and a tail rotor brake; and
wherein, in the partially engaged position of the isolation assembly and with the main rotor system operating, the tail rotor brake is configured to stop rotation of the tail rotor when the secondary engine is shut down, thereby establishing a ground safety configuration of the rotorcraft.

13. The tail rotor isolation system as recited in claim 1 wherein, in the partially engaged position of the isolation assembly, the overrunning mode of the second freewheeling unit is enabled such that the second freewheeling unit is configured for unidirectional torque transfer from the input race to the output race of the second freewheeling.

14. The tail rotor isolation system as recited in claim 1 wherein, in the fully engaged position of the isolation assembly, the overrunning mode of the second freewheeling unit is disabled such that the second freewheeling unit is configured for bidirectional torque transfer between the input race and the output race of the second freewheeling.

15. A rotorcraft comprising:
a main rotor system including a main engine, a main rotor gearbox coupled to the main engine and a main rotor coupled to the main rotor gearbox;
a secondary engine;
first and second freewheeling units each having an input race and an output race such that torque applied to the input race is transferred to the output race in a driving mode and torque applied to the output race is not transferred to the input race in an overrunning mode, the input race of the first freewheeling unit coupled to the secondary engine, the output race of the second freewheeling unit coupled to the main rotor system;
an isolation assembly disposed between the first and second freewheeling units, the isolation assembly coupled to the output race of the first freewheeling unit, the isolation assembly having a fully engaged position in which the isolation assembly couples the input and output races of the second freewheeling unit and a partially engaged position in which the isolation assembly is coupled to the input race of the second freewheeling unit and decoupled from the output race of the second freewheeling unit; and
a tail rotor system coupled to the input race of the second freewheeling unit;
wherein, in the partially engaged position of the isolation assembly, the overrunning mode of the second freewheeling unit isolates the tail rotor system from torque generated by the main rotor system;
wherein, in the partially engaged position of the isolation assembly, the tail rotor system is coupled to torque generated by the secondary engine; and
wherein, in the fully engaged position of the isolation assembly, the tail rotor system is coupled to torque generated by the main rotor system and the secondary engine.

16. The rotorcraft as recited in claim 15 wherein the rotorcraft is a helicopter.

17. The rotorcraft as recited in claim 15 wherein the tail rotor system further comprises a tail rotor and a tail rotor brake; and
wherein, in a ground safety configuration, the isolation assembly is in the partially engaged position, the main rotor system is operating, the secondary engine is shut down and the tail rotor brake is engaged to stop rotation of the tail rotor.

18. The rotorcraft as recited in claim 15 wherein, in an enhanced power configuration, the isolation assembly is in the fully engaged position, the main engine provides power to the main rotor gearbox and the secondary engine provides power to the tail rotor system and the main rotor system through the first and second freewheeling units and the isolation assembly.

19. The rotorcraft as recited in claim 15 wherein, in a high efficiency configuration, the isolation assembly is in the fully engaged position, the secondary engine is in standby mode and the main engine provides power to the main rotor gearbox and the tail rotor system through the second freewheeling unit.

20. The rotorcraft as recited in claim 15 wherein, in an enhanced autorotation configuration, the isolation assembly is in the fully engaged position, the main engine is not operating and the secondary engine provides power to the main rotor system through the first and second freewheeling units and the isolation assembly.

\* \* \* \* \*